US012101717B2

(12) United States Patent
Cai et al.

(10) Patent No.: US 12,101,717 B2
(45) Date of Patent: Sep. 24, 2024

(54) WIRELESS COMMUNICATIONS METHOD AND APPARATUS

(71) Applicant: HUAWEI TECHNOLOGIES CO., LTD., Guangdong (CN)

(72) Inventors: Yu Cai, Beijing (CN); Haibo Xu, Beijing (CN); Xiaocui Li, Beijing (CN); Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 499 days.

(21) Appl. No.: 17/277,359

(22) PCT Filed: Sep. 19, 2019

(86) PCT No.: PCT/CN2019/106558
§ 371 (c)(1),
(2) Date: Mar. 18, 2021

(87) PCT Pub. No.: WO2020/057575
PCT Pub. Date: Mar. 26, 2020

(65) Prior Publication Data
US 2021/0360528 A1    Nov. 18, 2021

(30) Foreign Application Priority Data
Sep. 19, 2018   (CN) .......................... 201811095995.9

(51) Int. Cl.
*H04W 52/02*    (2009.01)
*H04W 24/08*    (2009.01)
(Continued)

(52) U.S. Cl.
CPC ....... *H04W 52/0229* (2013.01); *H04W 24/08* (2013.01); *H04W 72/0446* (2013.01); *H04W 72/23* (2023.01); *H04W 76/28* (2018.02)

(58) Field of Classification Search
CPC ... H04W 28/04; H04W 72/04; H04W 72/042; H04W 88/08; H04W 52/0229;
(Continued)

(56) References Cited

U.S. PATENT DOCUMENTS

2007/0248046 A1*  10/2007  Khan ................. H04Q 7/00
                                                          370/329
2013/0301503 A1*  11/2013  Park ................... H04L 1/1861
                                                          370/311
(Continued)

FOREIGN PATENT DOCUMENTS

CN         102075993 A       5/2011
CN         104937973 A       9/2015
(Continued)

OTHER PUBLICATIONS

3GPP TSG-RAN WG4 #86, Athens, Greece, Feb. 26-Mar. 2, 2018, R4-1802790, Source: Nokia, Nokia Shanghai Bell, Title: Considerations on new SCell state, Agenda item: 6.25.2. (Year: 2018).*
(Continued)

*Primary Examiner* — Peter G Solinsky
*Assistant Examiner* — Sanjay K Dewan
(74) *Attorney, Agent, or Firm* — Fish & Richardson P.C.

(57) ABSTRACT

A method includes: receiving, by a terminal device, indication information on a first serving cell; and performing, by the terminal device, first processing if the indication information indicates not to monitor a PDCCH, where the first processing includes at least one of the following: not monitoring a PDCCH on at least one second serving cell or not monitoring a PDCCH for the at least one second serving cell; or performing, by the terminal device, second processing if the indication information indicates to monitor a PDCCH, where the second processing includes at least one of the following: monitoring a PDCCH on at least one
(Continued)

second serving cell or monitoring a PDCCH for the at least one second serving cell.

20 Claims, 10 Drawing Sheets

(51) Int. Cl.
*H04W 72/04* (2023.01)
*H04W 72/0446* (2023.01)
*H04W 72/23* (2023.01)
*H04W 76/28* (2018.01)

(58) Field of Classification Search
CPC ..... H04W 76/28; H04W 72/23; H04W 24/08; H04W 72/0446; H04L 5/0007
USPC .......................................................... 370/329
See application file for complete search history.

(56) References Cited

U.S. PATENT DOCUMENTS

| | | | |
|---|---|---|---|
| 2015/0124788 A1 | 5/2015 | Jang et al. | |
| 2015/0245337 A1* | 8/2015 | Park | H04L 5/1469 370/329 |
| 2016/0119969 A1* | 4/2016 | Vajapeyam | H04W 72/0453 370/329 |
| 2016/0227455 A1* | 8/2016 | Lei | H04L 5/001 |
| 2021/0307108 A1* | 9/2021 | Babaei | H04L 1/189 |
| 2022/0022067 A1* | 1/2022 | Kim | H04W 24/08 |

FOREIGN PATENT DOCUMENTS

| | | | |
|---|---|---|---|
| CN | 105871527 A | 8/2016 | |
| CN | 106105087 A | 11/2016 | |
| EP | 2 919 551 A1 * | 9/2015 | ............ H04W 76/04 |
| EP | 3 716 520 A1 * | 9/2020 | ............... H04L 5/00 |
| EP | 3 734 886 A1 * | 11/2020 | ............... H04L 5/00 |
| JP | 2012522456 A | 9/2012 | |
| JP | 2013197623 A | 9/2013 | |
| WO | WO 2016/163656 A1 * | 10/2016 | ............ H04W 74/00 |
| WO | 2020029798 A1 | 2/2020 | |

OTHER PUBLICATIONS

3GPP TSG-RAN2 #101 bis, Sanya, China, Apr. 16-Apr. 20, 2018, R2-1804436, Agenda item: 9.9.4, Source: OPPO, Title: SCell dormant control using new MAC CE. (Year: 2018).*
Extended European Search Report issued in European Application No. 19863949.4 dated Nov. 8, 2021, 8 pages.
Nokia et al., "Considerations on new SCell state," 3GPP TSG RAN WG4 #86, R4-1802790, Athens, Greece, Feb. 26-Mar. 2, 2018, 10 pages.
Office Action in Korean Appln. No. 10-2021-7011190, dated Feb. 21, 2023, 7 pages (with English translation).
3GPP TS 38.212 V15.2.0 (Jun. 2018), "3rd Generation Partnership Project; Technical Specification Group Radio Access Network;NR;Multiplexing and channel coding(Release 15)," Jun. 2018, 98 pages.
3GPP TS 38.213 V15.2.0 (Jun. 2018), "3rd Generation Partnership Project; Technical Specification Group Radio Access Network;NR; Physical layer procedures for control(Release 15)," Jun. 2018, 99 pages.
3GPP TS 38.321 V15.2.0 (Jun. 2018), "3rd Generation Partnership Project; Technical Specification Group Radio Access Network;NR;Medium Access Control (MAC) protocol specification(Release 15)," Jun. 2018, 73 pages.
3GPP TS 38.331 V15.2.1 (Jun. 2018), "3rd Generation Partnership Project; Technical Specification Group Radio Access Network;NR-;Radio Resource Control (RRC) protocol specification(Release 15)," Jun. 2018, 303 pages.
Huawei et al., "BWP/SCell operation for UE power saving," 3GPP TSG RAN WG1 Meeting #97, R1-1907518, Reno, USA, May 13-17, 2019, 6 pages.
Huawei et al., "Introduction of core requirements of radio link monitoring in CA," 3GPP TSG-RAN WG4 Meeting #58, R4-111082, Taipei, Feb. 21-25, 2011, 6 pages.
Huawei et al., "General considerations on UE power saving in Rel-16," 3GPP TSG RAN WG1 Meeting #94, R1-1809333, Gothenburg, Sweden, Aug. 20-24, 2018, 5 pages.
Office action issued in Chinese Application No. 201811095995.9 dated Aug. 17, 2021, 21 pages (with English translation).
Oppo et al., "SCell dormant control using new MAC CE," 3GPP TSG-RAN2 #101 bis, R2-1804436, Sanya, China, Apr. 16-20, 2018, 3 pages.
PCT International Search Report and Written Opinion issued in International Application No. PCT/CN2019/106558 dated Dec. 20, 2019, 20 pages (with English translation).
Qualcomm Incorporated et al., "Fast SCell activation for enhanced CA utilization," 3GPP TSG-RAN2 Meeting #99bis, R2-1710138 (Revision of R2-1707787), Prague, Czech Republic, Oct. 9-13, 2017, 8 pages.
Qualcomm Incorporated, "Views on UE power saving," 3GPP TSG RAN WG1 Meeting #94, R1-1809462, Gothenburg, Sweden, Aug. 20-24, 2018, 11 pages.
Vivo, "Power saving for BWP/SCell operation in RRC_CONNECTED," 3GPP TSG-RAN WG2 Meeting #106, R2-1905957 (Revision of R2-1903201), Reno, USA, May 13-17, 2019, 7 pages.
Office Action issued in Japanese Application No. 2021-515086 dated Jun. 28, 2022, 6 pages (with English translation).
Huawei, HiSilicon, Discussion on UE power saving in CA scenario, 3GPP TSG RAN WG2 #105 R2-1901289, 3GPP, Feb. 15, 2019, 4 pages.
Notice of Allowance in Japanese Appln. No. 2021-515086, dated Jan. 31, 2023, 4 pages (with English translation).

* cited by examiner

WIRELESS COMMUNICATIONS METHOD AND APPARATUS

CROSS-REFERENCE TO RELATED APPLICATIONS

This application is a national stage of International Application No. PCT/CN2019/106558, filed on Sep. 19, 2019, which claims priority to Chinese Patent Application No. 201811095995.9, filed on Sep. 19, 2018. Both of the aforementioned applications are hereby incorporated by reference in their entireties.

TECHNICAL FIELD

This application relates to the communications field, and in particular, to a wireless communications method and apparatus.

BACKGROUND

In a long term evolution (long term evolution, LTE) communications system, a discontinuous reception (discontinuous reception, DRX) function is defined. When a terminal device is in a radio resource control (radio resource control, RRC) connected (connected) mode, DRX may be used to control the terminal device to monitor behavior of a physical downlink control channel (physical downlink control channel, PDCCH), to reduce unnecessary power consumption of the terminal device. To further reduce power consumption of monitoring the PDCCH by the terminal device, a base station may send indication information, to notify the terminal device that the terminal device does not need to monitor the PDCCH in the following several slots (slot).

In a carrier aggregation (carrier aggregation, CA) scenario, the terminal device may be simultaneously connected to a plurality of server cells such as a primary cell (primary cell, PCell) and a secondary cell (secondary cell, SCell), and the terminal device may aggregate carrier units corresponding to the plurality of server cells such as the PCell and the SCell to send data, so that a transmission rate can be increased.

However, currently, no method for designing and sending the indication information to reduce power consumption of monitoring the PDCCH by the terminal device is proposed in the carrier aggregation scenario.

SUMMARY

Embodiments of this application provide a wireless communications method and apparatus, to reduce power consumption of monitoring a PDCCH by a terminal device in a carrier aggregation scenario.

According to a first aspect, an embodiment of this application provides a wireless communications method, including: receiving, by a terminal device, indication information on a first serving cell; and performing, by the terminal device, first processing if the indication information indicates not to monitor a PDCCH, where the first processing includes at least one of the following: not monitoring a PDCCH on the first serving cell, not monitoring a PDCCH in at least one second serving cell, not monitoring a PDCCH for the first serving cell, or not monitoring a PDCCH for the at least one second serving cell; or performing, by the terminal device, second processing if the indication information indicates to monitor a PDCCH, where the second processing includes at least one of the following: monitoring a PDCCH on the first serving cell, monitoring a PDCCH on the at least one second serving cell, monitoring a PDCCH for the first serving cell, or monitoring a PDCCH for the at least one second serving cell. According to the solution provided in this embodiment of this application, after the terminal device receives the indication information on the first serving cell, if the indication information indicates not to monitor the PDCCH, the terminal device may perform the first processing, that is, correspondingly not monitor the PDCCH, to reduce power consumption of monitoring the PDCCH by the terminal device.

The not monitoring a PDCCH in the first serving cell includes at least one of the following: skipping, on the first serving cell, monitoring the PDCCH for the first serving cell, and not monitoring a PDCCH on the first serving cell for another serving cell of the terminal device. The not monitoring a PDCCH on at least one second serving cell indicates that for each serving cell on the at least one second serving cell, a PDCCH for the serving cell is not monitored on the serving cell, or a PDCCH for another serving cell of the terminal device is not monitored on the serving cell. The not monitoring a PDCCH for the first serving cell includes at least one of the following: skipping, on the first serving cell, monitoring the PDCCH for the first serving cell, and skipping, in another serving cell of the terminal device, monitoring the PDCCH for the first serving cell. The not monitoring a PDCCH for the at least one second serving cell indicates that for each serving cell on the at least one second serving cell, a PDCCH for the serving cell is not monitored on the serving cell, or a PDCCH for the serving cell is not monitored in another serving cell of the terminal device. A PDCCH for a serving cell means that transmission indicated by the PDCCH is transmission on the serving cell.

The monitoring a PDCCH on the first serving cell includes at least one of the following: on the first serving cell, monitoring the PDCCH for the first serving cell, and on the first serving cell, monitoring a PDCCH for another serving cell of the terminal device. The monitoring a PDCCH on at least one second serving cell indicates that for each serving cell on the at least one second serving cell, a PDCCH for the serving cell is monitored on the serving cell, or a PDCCH for another serving cell of the terminal device is monitored on the serving cell. The monitoring a PDCCH for the first serving cell includes at least one of the following: on the first serving cell, monitoring the PDCCH for the first serving cell, and on another serving cell of the terminal device, monitoring the PDCCH for the first serving cell. The monitoring a PDCCH for the at least one second serving cell indicates that for each serving cell on the at least one second serving cell, a PDCCH for the serving cell is monitored on the serving cell, or a PDCCH for the serving cell is monitored on another serving cell of the terminal device. A PDCCH for a serving cell means that transmission indicated by the PDCCH is transmission in the serving cell.

In a possible implementation, the receiving, by a terminal device, indication information on a first serving cell includes: receiving, by the terminal device, the indication information on the first serving cell in running duration of a first timer; and the performing, by the terminal device, first processing if the indication information indicates not to monitor a PDCCH includes: after the terminal device receives the indication information, performing, by the terminal device, the first processing in the running duration of the first timer, or in the running duration of the first timer and in running duration after n consecutive times that the first timer is started, where n is an integer greater than or equal to 1; or the performing, by the terminal device, second processing if the indication information indicates to monitor a PDCCH includes: after the terminal device receives the indication information, performing, by the terminal device, the second processing in the running duration of the first timer, or in the running duration of the first timer and in running duration after in consecutive times that the first timer is started, where m is an integer greater than or equal to 1.

In a possible implementation, the receiving, by a terminal device, indication information on a first serving cell includes: receiving, by the terminal device, the indication information on the first serving cell in running duration of a first timer; and the performing, by the terminal device, first processing if the indication information indicates not to monitor a PDCCH further includes: stopping, by the terminal device, the first timer after receiving the indication information.

The first timer is configured to determine a time length for monitoring the PDCCH by the terminal device after the terminal device receives the PDCCH, or the first timer is configured to determine a time length for monitoring the PDCCH by the terminal device in a discontinuous reception DRX cycle.

In a possible implementation, the performing, by the terminal device, first processing if the indication information indicates not to monitor a PDCCH includes: performing, by the terminal device, the first processing in a first time period after the terminal device receives the indication information, where time lengths of first time periods corresponding to the first serving cell and/or the at least one second serving cell are the same or different; or the performing, by the terminal device, second processing if the indication information indicates to monitor a PDCCH includes: performing, by the terminal device, the second processing in a second time period after the terminal device receives the indication information, where time lengths of second time periods corresponding to the first serving cell and/or the at least one second serving cell are the same or different.

In a possible implementation, the receiving, by a terminal device, indication information on a first serving cell includes: receiving, by the terminal device, the indication information on the first serving cell before on-duration period of a first DRX cycle; and the performing, by the terminal device, first processing if the indication information indicates not to monitor a PDCCH includes: after receiving the indication information, performing, by the terminal device, the first processing in the on-duration period of the first DRX cycle; or performing the first processing in the on-duration period of the first DRX cycle and in on-duration period of at least one DRX cycle after the first DRX cycle; or the performing, by the terminal device, second processing if the indication information indicates to monitor a PDCCH includes: after receiving the indication information, performing, by the terminal device, the second processing in the on-duration period of the first DRX cycle; or performing the second processing in the on-duration period of the first DRX cycle and in on-duration period of at least one DRX cycle after the first DRX cycle.

In a possible implementation, if the indication information indicates not to monitor the PDCCH on the first serving cell and/or the at least one second serving cell, and the first serving cell and/or the at least one second serving cell include/includes a PCell, the performing, by the terminal device, first processing includes: skipping, by the terminal device, monitoring a PDCCH on all serving cells of the terminal device, where all the serving cells include the first serving cell and the at least one second serving cell; or if the indication information indicates to monitor the PDCCH on the first serving cell and/or the at least one second serving cell, and the first serving cell and/or the at least one second serving cell include/includes a PCell, the performing, by the terminal device, second processing includes: monitoring, by the terminal device, a PDCCH on all serving cells of the terminal device, where all the serving cells include the first serving cell and the at least one second serving cell.

In a possible implementation, the indication information includes indexes/an index corresponding to the first serving cell and/or the at least one second serving cell; or the indication information includes a bitmap used to indicate the first serving cell and/or the at least one second serving cell.

In a possible implementation, if the indication information indicates not to monitor the PDCCH, the indication information is further used to indicate time information for performing the first processing; or if the indication information indicates to monitor the PDCCH, the indication information is further used to indicate time information for performing the second processing.

In a possible implementation, the time information includes a time length corresponding to each of the first serving cell and/or the at least one second serving cell; or the time information includes one time length corresponding to the first serving cell and/or the at least one second serving cell.

According to a second aspect, an embodiment of this application provides a wireless communications method, including: sending, by a network device, indication information on a first serving cell; and performing, by the network device, third processing if the indication information indicates not to monitor a PDCCH, where the third processing includes at least one of the following: not sending a PDCCH on the first serving cell, not sending a PDCCH on at least one second serving cell, not sending a PDCCH for the first serving cell, or not sending a PDCCH for the at least one second serving cell; or performing, by the terminal device, fourth processing if the indication information indicates to monitor a PDCCH, where the fourth processing includes at least one of the following: sending a PDCCH on the first serving cell, sending a PDCCH on the at least one second serving cell, sending a PDCCH for the first serving cell, or sending a PDCCH for the at least one second serving cell.

The not sending a PDCCH on the first serving cell includes at least one of the following: skipping, on the first serving cell, sending the PDCCH for the first serving cell, and not sending a PDCCH on the first serving cell for another serving cell of the terminal device. The not sending a PDCCH on at least one second serving cell indicates that for each serving cell on the at least one second serving cell, a PDCCH for the serving cell is not sent in the serving cell, or a PDCCH for another serving cell of the terminal device is not sent in the serving cell. The not sending a PDCCH for the first serving cell includes at least one of the following: skipping, on the first serving cell, sending the PDCCH for the first serving cell, and skipping, on another serving cell of the terminal device, sending the PDCCH for the first serving cell. The skipping sending a PDCCH for the at least one second serving cell indicates that for each serving cell on the at least one second serving cell, a PDCCH for the serving cell is not sent in the serving cell, or a PDCCH for the serving cell is not sent in another serving cell of the terminal device. A PDCCH for a serving cell means that transmission indicated by the PDCCH is transmission on the serving cell.

The sending a PDCCH on the first serving cell includes at least one of the following: on the first serving cell, sending the PDCCH for the first serving cell, and on the first serving cell, sending a PDCCH for another serving cell of the terminal device. The sending a PDCCH on at least one second serving cell indicates that for each serving cell on the at least one second serving cell, a PDCCH for the serving cell is sent on the serving cell, or a PDCCH for another serving cell for the terminal device is sent on the sewing cell. The sending a PDCCH for the first serving cell includes at least one of the following: on the first serving cell, sending the PDCCH for the first serving cell, and on another serving cell of the terminal device, sending the PDCCH for the first serving cell. The sending a PDCCH for the at least one second serving cell indicates that for each serving cell on the at least one second serving cell, a PDCCH for the serving cell is sent on the serving cell, or a PDCCH for the serving cell is sent on another serving cell of the terminal device. A PDCCH for a serving cell means that transmission indicated by the PDCCH is transmission on the serving cell.

In a possible implementation, the sending, by a network device, indication information on a first serving cell includes: sending, by the network device, the indication information on the first serving cell in running duration of a first timer; and the performing, by the network device, third processing if the indication information indicates not to monitor a PDCCH includes: after the network device sends the indication information, performing, by the network device, the third processing in the running duration of the first timer, or in the running duration of the first timer and in running duration after n consecutive times that the first timer is started where n is an integer greater than or equal to 1; or the performing, by the network device, fourth processing if the indication information indicates to monitor a PDCCH includes: after the network device sends the indication information, performing, by the network device, the fourth processing in the running duration of the first timer, or in the running duration of the first timer and in running duration after m consecutive times that the first timer is started, where m is an integer greater than or equal to 1.

In a possible implementation, the sending, by a network device, indication information on a first serving cell includes: sending, by the network device, the indication information on the first serving cell in running duration of a first timer; and the performing, by the network device, third processing if the indication information indicates not to monitor a PDCCH further includes: stopping, by the network device, the first timer after sending the indication information.

In a possible implementation, the performing, by the network device, third processing if the indication information indicates not to monitor a PDCCH includes: performing, by the network device, the third processing in a first time period after the network device sends the indication information, where time lengths of first time periods corresponding to the first serving cell and/or the at least one second serving cell are the same or different; or the performing, by the terminal device, fourth processing if the indication information indicates to monitor a PDCCH includes: performing, by the network device, the fourth processing in a second time period after the network device sends the indication information, where time lengths of second time periods corresponding to the first serving cell and/or the at least one second serving cell are the same or different.

In a possible implementation, the sending, by a network device, indication information on a first serving cell includes: sending, by the network device, the indication information on the first serving cell before on-duration period of a first DRX cycle: and the performing, by the network device, third processing if the indication information indicates not to monitor a PDCCH includes: after sending the indication information, performing, by the network device, the third processing in the on-duration period of the first DRX cycle; or performing the third processing in the on-duration period of the first DRX cycle and in on-duration period of at least one DRX cycle after the first DRX cycle; or the performing, by the network device, fourth processing if the indication information indicates to monitor a PDCCH includes: after sending the indication information, performing, by the network device, the fourth processing in the on-duration period of the first DRX cycle; or performing the fourth processing in the on-duration period of the first DRX cycle and in on-duration period of at least one DRX cycle after the first DRX cycle.

In a possible implementation, if the indication information indicates not to monitor the PDCCH on the first serving cell and/or the at least one second serving cell, and the first serving cell and/or the at least one second serving cell include/includes a PCell, the performing, by the network device, third processing includes: skipping, by the network device, sending a PDCCH in all serving cells of the terminal device, where all the serving cells include the first serving cell and the at least one second serving cell; or if the indication information indicates to monitor the PDCCH on the first serving cell and/or the at least one second serving cell, and the first serving cell and/or the at least one second serving cell include/includes a PCell, the performing, by the network device, fourth processing includes: sending, by the network device, a PDCCH on all serving cells of the terminal device, where all the serving cells include the first serving cell and the at least one second serving cell.

In a possible implementation, the indication information includes indexes/an index corresponding to the first serving cell and/or the at least one second serving cell; or the indication information includes a bitmap used to indicate the first serving cell and/or the at least one second serving cell.

In a possible implementation, the time information includes a time length corresponding to each of the first serving cell and/or the at least one second serving cell; or the time information includes one time length corresponding to the first serving cell and/or the at least one second serving cell.

According to a third aspect, an embodiment of this application provides a terminal device, including: a receiving unit, configured to receive indication information on a first serving cell; and a monitoring unit, configured to: perform first processing if the indication information indicates not to monitor a PDCCH, where the first processing includes at least one of the following: not monitoring a PDCCH on the first serving cell, not monitoring a PDCCH on at least one second serving cell, not monitoring a PDCCH for the first serving cell, or not monitoring a PDCCH for the at least one second serving cell; or perform second processing if the indication information indicates to monitor a PDCCH, where the second processing includes at least one of the following: monitoring a PDCCH on the first serving cell, monitoring a PDCCH on the at least one second serving cell, monitoring a PDCCH for the first serving cell, or monitoring a PDCCH for the at least one second serving cell.

In a possible implementation, the receiving unit is configured to receive the indication information for the first serving cell in running duration of a first timer; and if the indication information indicates not to monitor the PDCCH, the monitoring unit is configured to: after the receiving unit receives the indication information, perform the first processing in the running duration of the first timer, or in the running duration of the first timer and in running duration after n consecutive times that the first timer is started, where n is an integer greater than or equal to 1; or if the indication information indicates to monitor the PDCCH, the monitoring unit is configured to: after the receiving unit receives the indication information, perform the second processing in the running duration of the first timer, or in the running duration of the first timer and in running duration after in consecutive times that the first timer is started, where m is an integer greater than or equal to 1.

In a possible implementation, the receiving unit is configured to receive the indication information for the first serving cell in running duration of a first timer; and if the indication information indicates not to monitor the PDCCH, the monitoring unit is configured to stop the first timer after the receiving unit receives the indication information.

The first timer is configured to determine a time length for monitoring the PDCCH by the terminal device after the terminal device receives the PDCCH, or the first timer is configured to determine a time length for monitoring the PDCCH by the terminal device in a discontinuous reception DRX cycle.

In a possible implementation, if the indication information indicates not to monitor the PDCCH, the monitoring unit is configured to perform the first processing in a first time period after the receiving unit receives the indication information, where time lengths of first time periods corresponding to the first serving cell and/or the at least one second serving cell are the same or different; or if the indication information indicates to monitor the PDCCH, the monitoring unit is configured to perform the second processing in a second time period after the receiving unit receives the indication information, where time lengths of second time periods corresponding to the first serving cell and/or the at least one second serving cell are the same or different.

In a possible implementation, the receiving unit is configured to receive the indication information on the first serving cell before on-duration period of a first DRX cycle; and if the indication information indicates not to monitor the PDCCH, the monitoring unit is configured to: after the receiving unit receives the indication information, perform the first processing in the on-duration period of the first DRX cycle; or perform the first processing in the on-duration period of the first DRX cycle and in on-duration period of at least one DRX cycle after the first DRX cycle; or if the indication information indicates to monitor the PDCCH, the monitoring unit is configured. to: after the receiving unit receives the indication information, perform the second processing in the on-duration period of the first DRX cycle; or perform the second processing in the on-duration period of the first DRX cycle and in on-duration period of at least one DRX cycle after the first DRX cycle.

In a possible implementation, if the indication information indicates not to monitor the PDCCH on the first serving cell and/or the at least one second serving cell, and the first serving cell and/or the at least one second serving cell include/includes a PCell, the monitoring unit is configured to skip monitoring a PDCCH on all serving cells of the terminal device, where all the serving cells include the first serving cell and the at least one second serving cell; or if the indication information indicates to monitor the PDCCH on the first serving cell and/or the at least one second serving cell, and the first serving cell and/or the at least one second serving cell include/includes a PCell, the monitoring unit is configured to monitor a PDCCH on all serving cells of the terminal device, where all the serving cells include the first serving cell and the at least one second serving cell.

In a possible implementation, the indication information includes indexes/an index corresponding to the first serving cell and/or the at least one second serving cell; or the indication information includes a bitmap used to indicate the first serving cell and/or the at least one second serving cell.

In a possible implementation, if the indication information indicates not to monitor the PDCCH, the indication information is further used to indicate time information for performing the first processing; or if the indication information indicates to monitor the PDCCH, the indication information is further used to indicate time information for performing the second processing.

In a possible implementation, the time information includes a time length corresponding to each of the first serving cell and/or the at least one second serving cell; or the time information includes one time length corresponding to the first serving cell and/or the at least one second serving cell.

According to a fourth aspect, an embodiment of this application provides a network device, including: a sending unit, configured to send indication information on a first serving cell; and a processing unit, configured to: perform third processing by using the sending unit if the indication information indicates not to monitor a PDCCH, where the third processing includes at least one of the following: not sending a PDCCH on the first serving cell, not sending a PDCCH on at least one second serving cell, not sending a PDCCH for the first serving cell, or not sending a PDCCH for the at least one second serving cell; or perform fourth processing by using the sending unit if the indication information indicates to monitor a PDCCH, where the fourth processing includes at least one of the following: sending a PDCCH on the first serving cell, sending a PDCCH on the at least one second serving cell, sending a PDCCH for the first serving cell, or sending a PDCCH for the at least one second serving cell.

In a possible implementation, the sending unit is configured to send the indication information on the first serving cell in running duration of a first timer; and if the indication information indicates not to monitor the PDCCH, the processing unit is configured to: after the sending unit sends the indication information, perform the third processing in the running duration of the first timer, or in the running duration of the first timer and in running duration after n consecutive times that the first timer is started, where n is an integer greater than or equal to 1; or if the indication information indicates to monitor the PDCCH, the processing unit is configured to: after the sending unit sends the indication information, perform the fourth processing in the running duration of the first timer, or in the running duration of the first timer and in running duration after m consecutive times that the first timer is started, where m is an integer greater than or equal to 1.

In a possible implementation, the sending unit is configured to send the indication information on the first serving cell in running duration of a first timer; and if the indication information indicates not to monitor the PDCCH, the processing unit is further configured to stop the first timer after the sending unit sends the indication information.

In a possible implementation, if the indication information indicates not to monitor the PDCCH, the processing unit is configured to perform the third processing in a first time period after the sending unit sends the indication information, where time lengths of first time periods corresponding to the first serving cell and/or the at least one second serving cell are the same or different; or if the indication information indicates to monitor the PDCCH, the processing unit is configured to perform the fourth processing in a second time period after the sending unit sends the indication information, where time lengths of second time periods corresponding to the first serving cell and/or the at least one second serving cell are the same or different.

In a possible implementation, the sending unit is configured to send the indication information on the first serving cell before on-duration period of a first DRX cycle; and if the indication information indicates not to monitor the PDCCH, the processing unit is configured to: after the sending unit sends the indication information, perform the third processing in the on-duration period of the first DRX cycle; or perform the third processing in the on-duration period of the first DRX cycle and in on-duration period of at least one DRX cycle after the first DRX cycle; or if the indication information indicates to monitor the PDCCH, the processing unit is configured to: after the sending unit sends the indication information, perform the fourth processing in the on-duration period of the first DRX cycle; or perform the fourth processing in the on-duration period of the first DRX cycle and in on-duration period of at least one DRX cycle after the first DRX cycle.

In a possible implementation, if the indication information indicates not to monitor the PDCCH on the first serving cell and/or the at least one second serving cell, and the first serving cell and/or the at least one second serving cell include/includes a PCell, the processing unit is configured to skip, by using the sending unit, sending a PDCCH in all serving cells of the terminal device, where all the serving cells include the first serving cell and the at least one second serving cell; or if the indication information indicates to monitor the PDCCH on the first serving cell and/or the at least one second serving cell, and the first serving cell and/or the at least one second serving cell include/includes the PCell, the processing unit is configured to send, by using the sending unit, a PDCCH in all serving cells of the terminal device, where all the serving cells include the first serving cell and the at least one second serving cell.

In a possible implementation, the indication information includes indexes/an index corresponding to the first serving cell and/or the at least one second serving cell; or the indication information includes a bitmap used to indicate the first serving cell and/or the at least one second serving cell.

In a possible implementation, the time information includes a time length corresponding to each of the first serving cell and/or the at least one second serving cell; or the time information includes one time length corresponding to the first serving cell and/or the at least one second serving cell.

According to a fifth aspect, an embodiment of this application provides a computer readable storage medium, including an instruction. When the instruction is run on a computer, the computer is enabled to perform any method provided in the first aspect or the second aspect.

According to a sixth aspect, an embodiment of this application provides a computer program product including an instruction. When the computer program product is run on a computer, the computer is enabled to perform any method provided in the first aspect or the second aspect.

According to a seventh aspect, an embodiment of this application provides a chip system. The chip system includes a processor, and may further include a memory, configured to implement a function of the terminal device or the network device in the foregoing methods. The chip system may include a chip, or may include a chip and another discrete device.

According to an eighth aspect, an embodiment of this application further provides an apparatus. The apparatus includes a processor, configured to implement a function of the terminal device in the method described in the first aspect, or configured to implement a function of the network device in the method described in the second aspect. The apparatus may further include a memory, configured to store a program instruction and data. The memory is coupled to the processor, and the processor may invoke and execute the program instruction stored in the memory, to implement a function of the terminal device in the method described in the first aspect, or to implement a function of the network device in the method described in the second aspect. The apparatus may further include a communications interface, and the communications interface is used by the apparatus to communicate with another device.

According to a ninth aspect, an embodiment of this application provides a system. The system includes the terminal device in the third aspect and the network device in the fourth aspect.

DESCRIPTION OF EMBODIMENTS

To make descriptions of the following embodiments clear and concise, related concepts or technologies are first briefly described.

A new radio access technology (new radio access technical, New RAT or NR) follows a DRX mechanism in LTE. The new RAT or NR may also be referred to as a 5th generation (the fifth generation, 5G) mobile communications system. A DRX function may be configured for a terminal device (for example, user equipment (User Equipment, UE)) in an RRC connected mode. DRX may be used to control the UE to monitor a PDCCH in some time periods in a DRX cycle (DRX cycle), and not monitor the PDCCH in other time periods. For example, the DRX may be used to control the UE to monitor a PDCCH scrambled by using a cell radio network temporary identity (cell radio network temporary identity, C-RNTI), a configured scheduling radio network temporary identity (configured scheduling RNTI, CS-RNTI), an interruption radio network temporary identity (interruption RNTI, INT-RNTI), a slot format indication radio network temporary identity (slot format indication RNTI, SFI-RNTI), a semi-persistent channel state information radio network temporary identity (semi-persistent CSI RNTI, SP-CSI-RNTI), a transmit power control radio network temporary identity (transmit power control RNTI, TPC-PUCCH-RNTI), a transmit power control physical uplink shared channel radio network temporary identity (transmit power control physical uplink shared channel RNTI, TPC-PUSCH-RNTI), or a transmit power control sounding reference signal radio network temporary identity (transmit power control sounding reference signal RNTI, TPC-SRS-RNTI). An RNTI is short for a radio network temporary identity (radio network temporary identity). Because the PDCCH may be used to carry DCI, that the RNTI is used to scramble the PDCCH may also be understood as that the RNTI is used to scramble the DCI. A process of scrambling the DCI may be as follows: After cyclic redundancy check (cyclic redundancy check, CRC) attachment is performed on the DCI, the radio network temporary identity is used to scramble a CRC check bit; or the RNTI is used to scramble a sequence obtained after CRC attachment is performed on the DCI.

Figure 1:
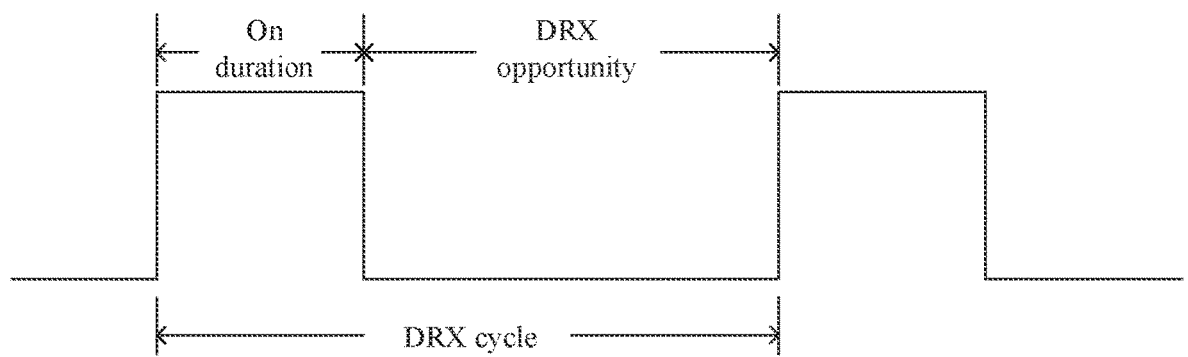
FIG. 1 is a schematic diagram of a DRX cycle according to an embodiment of this application.

As shown in FIG. 1, a DRX cycle includes on-duration period and an opportunity for DRX. The on-duration period may be referred to as on-duration period, and the opportunity for DRX may be referred to as a DRX opportunity, drx-onDurationTimer (drx-onDurationTimer, also referred to as onDurationTimer) may be started at a start moment of the on-duration period (or a start moment of the DRX cycle). A time length of drx-onDurationTimer is a time length of the on-duration period. The time length of drx-onDurationTimer includes a period of time at the beginning of a DRX cycle. The UE may monitor a PDCCH in the on-duration period, in other words, the UE may monitor the PDCCH in running duration of drx-onDurationTimer. The UE may start (or restart) an inactivity timer (drx-InactivityTimer) when receiving, in the running duration of drx-onDurationTimer, a PDCCH used to schedule new uplink (uplink, UL) or downlink (downlink, DL) transmission (that is, receiving a newly transmitted PDCCH). A time length of drx-InactivityTimer includes a period of time after the UE receives a PDCCH, for example, may be a period of time after a subframe in which the PDCCH is located, or may be a period of time after a PDCCH occasion in which the PDCCH is located. The PDCCH may be used to indicate new UL or DL transmission to the UE. The PDCCH occasion is a period of time (for example, one or more symbols) used by the terminal device to monitor the PDCCH, and may also be referred to as a PDCCH monitoring occasion. The UE may continue to monitor the PDCCH in running duration of drx-Inactivity Timer until drx-InactivityTimer expires.

When the UE listens on a PDCCH for a hybrid automatic repeat request (hybrid automatic repeat request, HARQ) of data, because there is no fixed time sequence relationship between previous transmission and retransmission, a time window is separately defined for an uplink HARQ process (process) and a downlink HARQ process, and the UE is allowed to start to listen on a PDCCH for uplink or downlink transmission after the time window that starts from previous uplink or downlink transmission. The time window may be implemented by using a timer. Each uplink HARQ process and each downlink HARQ process may correspond to one timer. For example, the timer corresponding to the downlink HARQ process is a HARQ RFT timer or drx-HARQ-RTT-TimerDL, and the timer corresponding to the uplink HARQ process is a UL HARQ RTT timer or drx-HARQ-RTT-TimerUL. An RTT is short for round nip time (round trip time). For the uplink HARQ process, when the corresponding timer expires, a corresponding uplink retransmission timer (drx-RetransmissionTimerUL, also referred to as drx-ULRetransmissionTimer) is started. For the downlink HARQ process, when the corresponding timer expires, a corresponding downlink retransmission timer (drx-RetransmissionTimerDL, also referred to as drx-RetransmissionTimer) is started. The UE listens on the PDCCH when drx-RetransmissionTimerUL or drx-RetransmissionTimerDL runs. drx-RetransmissionTimerUL may be defined as the maximum duration until a grant for UL retransmission is received (the maximum duration until a grant for UL retransmission is received). drx-RetransmissionTimerDL may be defined as the maximum duration until a grant for DL retransmission is received (the maximum duration until a grant for DL retransmission is received).

When the DRX cycle is configured, the UE may monitor the PDCCH in an active time (active time). When the DRX cycle is not configured, the UE does not need to monitor the PDCCH. The active time includes:

(1) At least one running time period of the following timers: drx-onDurationTimer, drx-InactivityTimer, drx-RetransmissionTimerUL, drx-RetransmissionTimerDL, or a contention resolution timer (ra-ContentionResolutionTimer or mac-ContentionResolutionTimer). The contention resolution timer may be configured to determine a time length for which the terminal device monitors a PDCCH used to indicate a message 4 after sending a message 3 in a random access process.

(2) A scheduling request (Scheduling Request, SR) is sent and is in a pending (pending) state. When an SR is triggered, the SR is in a pending state until the SR is canceled. A time period in which the SR is in the pending state is a time period between a moment at which the SR is sent and a moment at which the SR is canceled.

(3) After successfully receiving a random access response (random access response, RAR), the terminal device does not receive a PDCCH that is scrambled by using a C-RNTI and that indicates new transmission, where the RAR is not an RAR of a random access preamble selected by the UE from a contention-based random access preamble.

Embodiments of this application provide a wireless communications method and apparatus, and are applied to a process in which the terminal device monitors the PDCCH or does not monitor the PDCCH in a DRX cycle. For example, the embodiments of this application are applied to a process in which the terminal device monitors or does not monitor a PDCCH in a PCell and a process in which the terminal device monitors or does not monitor a PDCCH in one or more SCells that are in a carrier aggregation scenario.

It should be understood that in a carrier aggregation scenario, the UE maintains an RRC connection to the PCell. In an RRC connection establishment/reestablishment/handover process, the PCell provides non-access stratum (non-access stratum, NAS) mobility information. In an RRC connection reestablishment/handover process, the PCell provides secure input. One or more SCells may also be configured for the UE, and the one or more SCells and the PCell form a serving cell set. A primary component carrier (primary component carrier, PCC) corresponding to the PCell and a secondary component carrier (secondary component carrier, SCC) corresponding to the SCell may be aggregated. The UE may simultaneously receive or send data on one or more component carriers (component Carriers, CC) based on a capability of the UE. The CCs include a PCC and an SCC.

Figure 2:
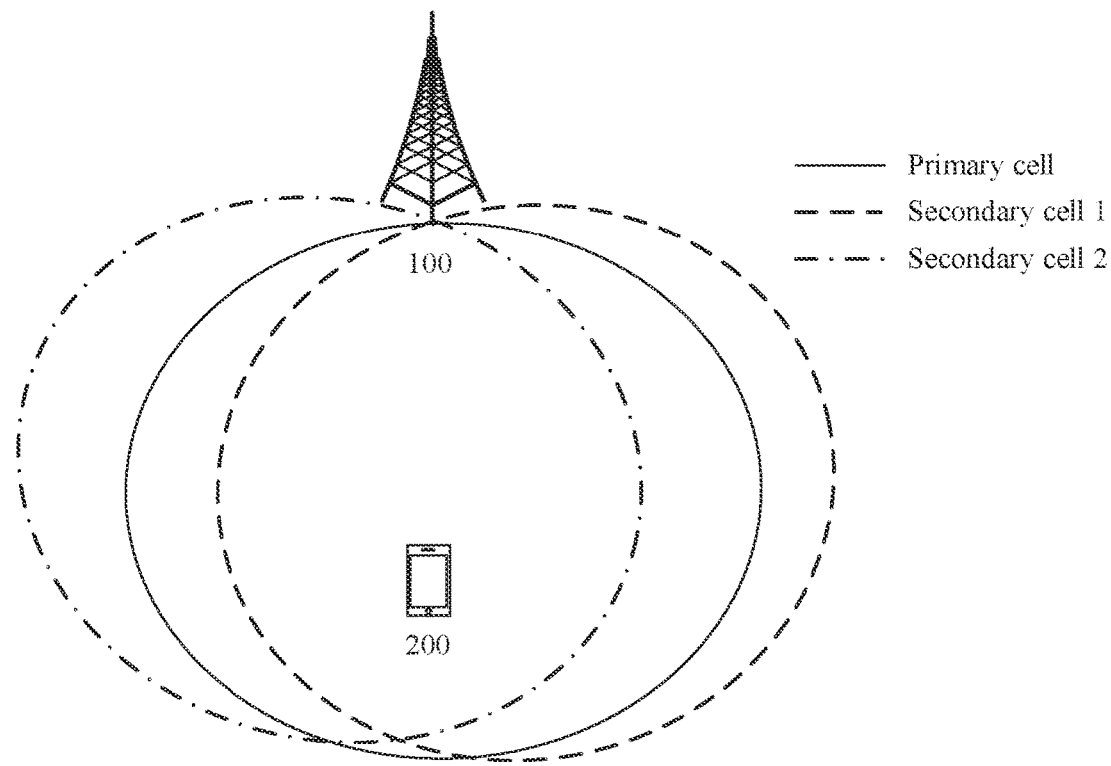
FIG. 2 is a schematic architectural diagram of a system to which a wireless communications method is applicable according to an embodiment of this application.

FIG. 2 is a schematic diagram of a communications system to which a technical solution is applicable according to an embodiment of this application. The communications system may include a network device 100 and one or more terminal devices 200 (FIG. 2 shows only one terminal device 200) connected to the network device 100. The network device may send a PDCCH in a primary cell or a secondary cell (for example, a secondary cell 1 or a secondary cell 2), and the terminal device may monitor or not monitor, in the primary cell or the secondary cell (for example, the secondary cell 1 or the secondary cell 2), the PDCCH sent by the network device, that is, the terminal device may monitor or not monitor uplink/downlink control information sent by the network device on the PDCCH.

The network device in the embodiments of this application includes a base station (base station, BS). The base station may have a plurality of forms, for example, a macro base station, a micro base station, a relay station, and an access point. For example, the base station in the embodiments of this application may be a base station in NR. The base station in NR may also be referred to as a transmission reception point (transmission reception point, TRP) or a gNB, or may be a base transceiver station (Base Transceiver Station, BTS) in GSM or CDMA, or may be a NodeB (NodeB, NB) in a WCDMA system, or may be an evolved NodeB (Evolutional NodeB, eNB or eNodeB) in an LTE system, or may be a next generation NodeB (Next generation NodeB, gNB) in a future 5G network. The network device in the embodiments of this application may alternatively include a device that is deployed in a radio access network and that can perform wireless communication with a terminal, for example, may be a radio controller in a cloud radio access network (Cloud Radio Access Network, CRAN) scenario. Alternatively, the network device may be a relay station, an access point, a network device in a future 5G network, a network device in a future evolved public land mobile network (Public Land Mobile Network, PLMN), or the like. In the embodiments of this application, an apparatus that implements a function of the network device may be the network device, or may be an apparatus that supports the network device in implementing the function, for example, a chip, a circuit, or another apparatus. In the embodiments of this application, an example in which an apparatus that implements a function of the network device is the network device is used to describe the technical solutions provided in the embodiments of this application.

The terminal device in the embodiments of this application may also be referred to as a terminal, and may be a device having wireless receiving and sending functions. The terminal device may be deployed on land, and includes an indoor device, an outdoor device, a handheld device, or a vehicle-mounted device. Alternatively, the terminal device may be deployed on a water surface (for example, on a ship), or may be deployed in the air (for example, on an aircraft, a balloon, or a satellite). The terminal device may be user equipment (user equipment, UE). The UE includes a handheld device, a vehicle-mounted device, a wearable device, or a computing device that has a wireless communication function. For example, the UE may be a mobile phone (mobile phone), a tablet computer, or a computer having wireless receiving and sending functions. Alternatively, the terminal device may be a virtual reality (virtual reality, VR) terminal device, an augmented reality (augmented reality, AR) terminal device, a wireless terminal in industrial control, a wireless terminal in self driving, a wireless terminal in remote medical, a wireless terminal in a smart grid, a wireless terminal in a smart city (smart city), a wireless terminal in a smart home (smart home), or the like. In this embodiment of this application, an apparatus that implements a function of the terminal may be a terminal, or may be an apparatus that supports the terminal to implement the function, such as a chip, a circuit, or another apparatus. In the embodiments of this application, an example in which an apparatus that implements a function of the terminal is the terminal is used to describe the technical solutions provided in the embodiments of this application.

The following describes the technical solutions in the embodiments of this application with reference to the accompanying drawings in the embodiments of this application. In the descriptions of this application, "a plurality of" means two or more than two unless otherwise stated. In addition, to clearly describe the technical solutions in the embodiments of this application, in the embodiments of this application, the terms such as "first" and "second" are used to distinguish between same items or similar items that have basically same functions and purposes. A person skilled in the art may understand that the terms such as "first" and "second" do not limit a quantity or an execution sequence, and the terms such as "first" and "second" do not indicate a definite difference.

The timer mentioned in the embodiments of this application is applicable to the following descriptions: Once the timer is started, the timer is in a running state until the timer stops or expires. Otherwise, the timer is in a non-running state. If the timer is in the non-running state, the timer may be started. If the timer is in the running state, the timer may be restarted. A value of the timer is an initial value of the timer when the timer is started or restarted. A time length of the timer may be understood as a time length from a moment at which the timer starts and continuously runs to a moment at which the timer expires, or a time length from a moment at which the timer restarts and continuously runs to a moment at which the timer expires.

It should be noted that names of various timers in the embodiments of this application are merely examples, and different names may be used in actual application. This is not limited in this application.

In the embodiments of this application, at least one of A, B, C, and D is included. It may be understood that A, B, C, or D is included. It may alternatively be understood that A, B, or C is included. It may alternatively be understood that A, B, or D is included. It may alternatively be understood that A, C, or D is included. It may alternatively be understood that B, C, or D is included. It may alternatively be understood that A or B is included. It may alternatively be understood that A or C is included. It may alternatively be understood that A or D is included. It may alternatively be understood that B or C is included. It may alternatively be understood that B or D is included. It may alternatively be understood that A is included. It may alternatively be understood that B is included. It may alternatively be understood that C is included. It may alternatively be understood that D is included. It may alternatively be understood that A, B, C, and D are included. It may alternatively be understood that A, B, and C are included, it may alternatively be understood that A, B, and D are included. It may alternatively be understood that A, C, and D are included. It may alternatively be understood that B, C, and D are included. It may alternatively be understood that A and B are included. It may alternatively be understood that A and C are included. It may alternatively be understood that A and D are included. It may alternatively be understood that B and C are included. It may alternatively be understood that B and D are included. This is not limited in this application. Similarly, at least one of A and B is included, and at least one of A, B, and C is included. For details, refer to the foregoing descriptions. The details are not described herein again.

Figure 3:
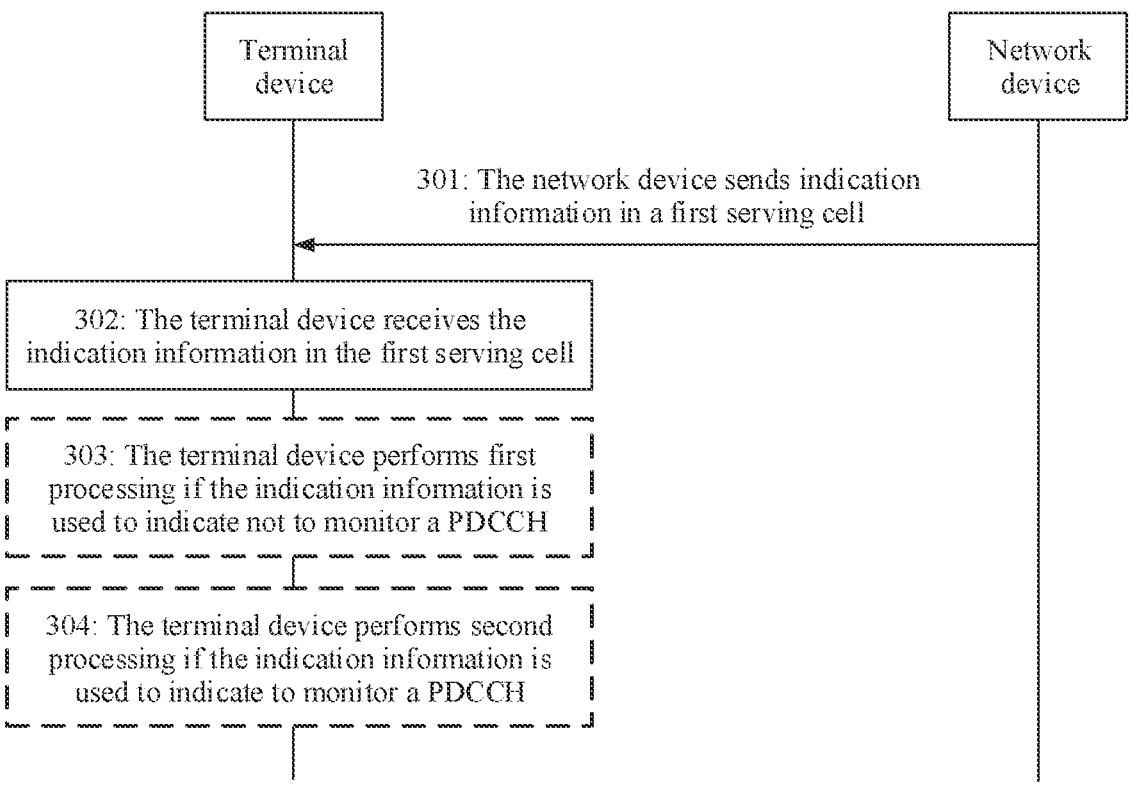
FIG. 3 is a schematic diagram of signal interaction in a wireless communications method according to an embodiment of this application.

An embodiment of this application provides a wireless communications method. As shown in FIG. 3, the method includes the following steps.

A network device sends indication information on a first serving cell.

The first serving cell may be any one of all serving cells of a terminal device, and all the serving cells of the terminal device include a PCell and one or more configured or activated SCells of the terminal device.

In a possible design, the indication information indicates (the terminal device) not to monitor a PDCCH, in other words, the indication information indicates (the terminal device) not to expect a PDCCH. Alternatively, the indication information indicates the network device not to send a PDCCH to the terminal device.

In another possible design, the indication information indicates to monitor a PDCCH.

For example, the indication information may include a bit used to indicate whether to monitor the PDCCH. When the bit is 0, it indicates that the PDCCH is not monitored. If the bit is 1, it indicates that the PDCCH is monitored.

For example, the indication information may alternatively not include a bit explicitly used to indicate whether to monitor the PDCCH, and the indication information may implicitly indicate the terminal device to monitor the PDCCH, or the indication information may implicitly indicate the terminal device not to monitor the PDCCH. For example, for each serving cell (for example, the first serving cell) in all the serving cells of the terminal device, if the terminal device does not monitor a PDCCH for the serving cell, or does not monitor a PDCCH on the serving cell, when receiving the indication information, the terminal device may monitor the PDCCH for the serving cell based on the indication information, or monitor the PDCCH on the serving cell. If the terminal device monitors a PDCCH for the serving cell, or monitors a PDCCH on the serving cell, when receiving the indication information, the terminal device may not monitor the PDCCH for the serving cell based on the indication information, or not monitor the PDCCH on the serving cell.

302: The terminal device receives the indication information on the first serving cell.

The terminal device performs step 303 if the indication information indicates not to monitor the PDCCH. The terminal device performs step 304 if the indication information indicates to monitor the PDCCH.

303: The terminal device performs first processing if the indication information indicates not to monitor the PDCCH.

The first processing includes at least one of the following: not monitoring a PDCCH on the first serving cell, not monitoring a PDCCH in at least one second serving cell, not monitoring a PDCCH for the first serving cell, or not monitoring a PDCCH for the at least one second serving cell. It should be understood that when the first serving cell is a PCell, the at least one second serving cell may include a configured SCell or an activated SCell of the terminal device. When the first serving cell is an SCell, the at least one second serving cell may include a configured SCell and/or PCell or an activated SCell and/or PCell of the terminal device.

The not monitoring a PDCCH on the first serving cell includes at least one of the following: skipping, on the first serving cell, monitoring the PDCCH for the first serving cell, and not monitoring a PDCCH on the first serving cell for another serving cell of the terminal device.

The not monitoring a PDCCH in at least one second serving cell indicates that for each serving cell on the at least one second serving cell, a PDCCH for the serving cell is not monitored on the serving cell, or a PDCCH for another serving cell of the terminal device is not monitored on the serving cell.

The not monitoring a PDCCH for the first serving cell includes at least one of the following: skipping, on the first serving cell, monitoring the PDCCH for the first serving cell, and skipping, on another serving cell of the terminal device, monitoring the PDCCH for the first serving cell.

The not monitoring a PDCCH for the at least one second serving cell indicates that for each serving cell on the at least one second serving cell, a PDCCH for the serving cell is not monitored on the serving cell, or a PDCCH for the serving cell is not monitored on another serving cell of the terminal device.

A PDCCH for a serving cell means that transmission indicated by the PDCCH is transmission on the serving cell.

In a possible design, the indication information may include indexes/an index corresponding to the first serving cell and/or the at least one second serving cell. An index of a serving cell of the terminal device may be configured by the network device. An index that corresponds to a serving cell and that is included in the indication information may be an index that is of the serving cell and that is configured by the network device, or may be an index determined based on the index that is of the serving cell and that is configured by the network device. For example, the index that is of the serving cell and that is configured by the network device is denoted as a first index, and the index that is of the serving cell and that is included in the indication information is denoted as a second index. The serving cells of the terminal device are numbered in a value order (in descending order or in ascending order) of the first indexes to obtain the second indexes. The serving cells of the terminal device may include a PCell and a configured SCell, or include only a configured SCell, or include a PCell and an activated SCell, or include only an activated SCell. For example, when a PCell and activated SCells of the terminal device are numbered in a value order of first indexes to obtain second indexes, if a first index of the PCell is 0, and first indexes of the two activated SCells are 1 and 3, a second index of the PCell is 0, a second index of an activated SCell whose first index is 1 is 1, and a second index of an activated SCell whose first index is 3 is 2.

Alternatively, the indication information includes a bitmap (bitmap) used to indicate the first serving cell and/or the at least one second serving cell. For example, the indication information may include one bitmap, each bit (bit) corresponds to one serving cell, and a length of the bitmap may be quantities of PCells and configured SCells of the terminal device, or may be a quantity of configured SCells of the terminal device, or may be quantities of PCells and activated SCells of the terminal device, or may be a quantity of activated SCells of the terminal device. For example, when the length of the bitmap is the quantities of PCells and configured SCells of the terminal device, if two SCells are configured for the terminal device, the length of the bitmap is 3.

Optionally, each serving cell of the terminal device corresponds to one index. Serving cells corresponding to bits in the bitmap may be determined in a value order of indexes of the serving cells. Based on the foregoing example, assuming that an index of the PCell is 0, and indexes of the two SCells configured for the terminal device are 2 and 4, the first bit in the bitmap may correspond to the PCell, the second bit in the bitmap corresponds to an SCell whose index is 2, and the third bit in the bitmap corresponds to an SCell whose index is 4.

The length of the bitmap may be determined based on a maximum value of the index of the serving cell of the terminal device. Optionally, the length of the bitmap is the maximum value of the index of the serving cell of the terminal device plus 1. For example, if the maximum value of the index of the serving cell is 3, the length of the bitmap is 4. Further, the first bit in the bitmap corresponds to a serving cell whose index is 0, the second bit in the bitmap corresponds to a serving cell whose index is 1, the third bit in the bitmap corresponds to a serving cell whose index is 2, and the fourth bit in the bitmap corresponds to a serving cell whose index is 3. The length of the bitmap may alternatively be determined based on a maximum quantity of serving cells that can be configured for the terminal device. Optionally, the length of the bitmap is the maximum quantity of serving cells that can be configured for the terminal device. For example, when a value of a bit is 1, it indicates that a serving cell corresponding to the bit belongs to the first serving cell and/or the at least one second serving cell. To be specific, after receiving the indication information, the terminal device does not monitor a PDCCH on the serving cell corresponding to the bit, or does not monitor a PDCCH for the serving cell corresponding to the bit.

In a possible design, if the indication information indicates not to monitor the PDCCH, the indication information further indicates time information for performing the first processing. The time information may include a time length corresponding to each of the first serving cell and/or the at least one second serving cell. For example, assuming that the first serving cell is a PCell, and the at least one second serving cell includes an SCell 1 and an SCell 2, the PCell, the SCell 1, and the SCell 2 each may correspond to a time length. For example, the PCell may correspond to three slots, the SCell 1 may correspond to two slots, and the SCell 2 may correspond to one slot. Alternatively, the time information may include one time length corresponding to the first serving cell and/or the at least one second serving cell. Based on the foregoing example, the PCell, the SCell 1, and the SCell 2 may correspond to a same time length. For example, the PCell, the SCell 1, and the SCell 2 each correspond to three slots.

In a possible design, the terminal device performs the first processing in a first time period after the terminal device receives the indication information. A time length of the first time period may be determined based on the time information. The first time period may include M time units (time units), and M is an integer greater than or equal to 1. The time unit may be an absolute time, for example, a second, a microsecond, or a millisecond, or may be a symbol, a slot, a subframe, or the like. This is not limited in this application. The first time period may alternatively include M PDCCH monitoring occasions, and M is an integer greater than or equal to 1.

Optionally, the first time period may be configured by the network device. For example, the first time period may be configured by using RRC signaling, or may be indicated in the indication information. When the indication information indicates the first time period, the indication information includes a field indicating a length of the first time period, and a value of the field is in a one-to-one correspondence with each time length in a time length set (including a plurality of different time lengths). For example, each time length in the time length set corresponds to an index, and the value of the field is an index corresponding to a corresponding time length. Optionally, the time length set may be configured by using RRC signaling.

In a possible design, each serving cell on the first serving cell and/or the at least one second serving cell may correspond to a first time period. Time lengths of first time periods corresponding to the first serving cell and/or the at least one second serving cell are the same or different. In another possible design, the first serving cell and/or the at least one second serving cell may correspond to a same first time period, in other words, time lengths of first time periods corresponding to all serving cells are the same.

Figure 3A:
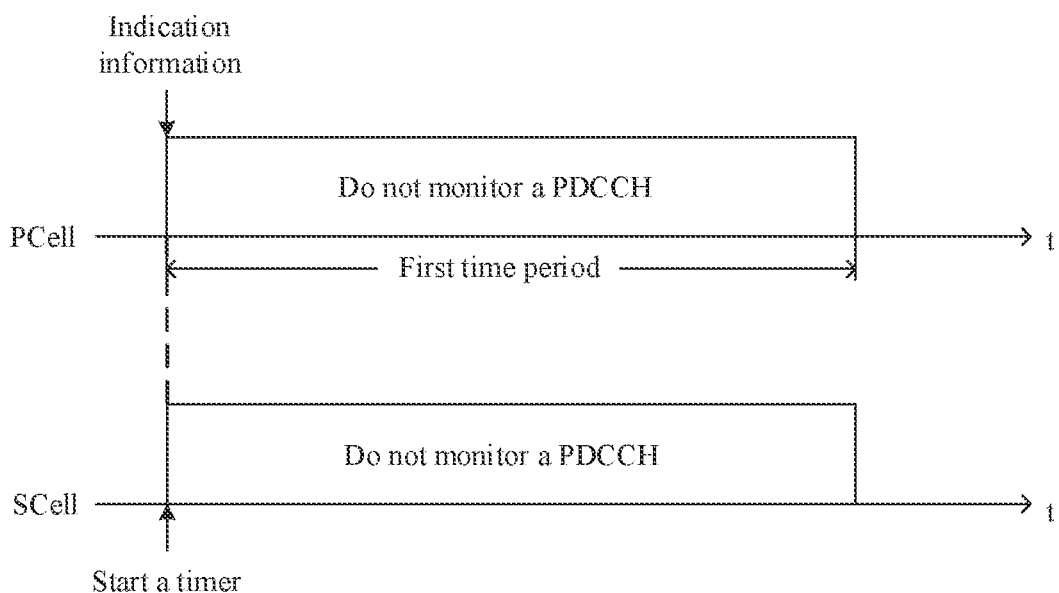
FIG. 3a is a schematic diagram of monitoring a PDCCH in a PCell and an SCell according to an embodiment of this application.

Optionally, when the first serving cell and/or the at least one second serving cell correspond/corresponds to a same first time period, the terminal device may start a timer after receiving the indication information, where a time length of the timer is a length of the first time period. When the timer runs, the terminal device performs the first processing. For example, as shown in FIG. 3a, assuming that the first serving cell is a PCell, and the at least one second serving cell includes one SCell, the indication information indicates the terminal device not to monitor a PDCCH on the first serving cell or the at least one second serving cell. When the PCell and the SCell correspond to a same first time period, the terminal device may start a timer after receiving the indication information, where a time length of the timer is the length of the first time period. When the timer runs, the terminal device may not monitor the PDCCH on the PCell or the SCell in the first time period.

Optionally, when each serving cell in the first serving cell and/or the at least one second serving cell corresponds to a first time period, after receiving the indication information, the terminal device may start a timer corresponding to each serving cell, where a time length of the timer corresponding to each serving cell is a length of the first time period corresponding to the serving cell. The terminal device performs the first processing based on a corresponding timer.

Further, assuming that the terminal device receives one piece of indication information again in the first time period, if a time length of a first time period in the indication information received for the first time is a first time length, and a time length of a first time period in the indication information received for the second time is a second time length, one or more of the following cases may be included: (a) After receiving the indication information again, the terminal device performs the first processing in the first time period in the indication information received for the second time. (b) After receiving the indication information again, and completing the first processing in the first time period in the indication information received for the first time, the terminal device continues to perform the first processing in the first time period in the indication information received for the second time. (c) After receiving the indication information again, the terminal device performs the first processing in a union set of the first time period in the indication information received for the first time and the first time period in the indication information received for the second time. For example, if the first time period in the indication information received for the first time includes the $0^{th}$ subframe to the $5^{th}$ subframe, and the first time period in the indication information received for the second time includes the $3^{rd}$ subframe to the $6^{th}$ subframe, a total time period of performing the first processing includes the $0^{th}$ subframe to the $6^{th}$ subframe.

In a possible design, the terminal device may perform the first processing after N time units after the terminal device receives the indication information, where N is greater than or equal to 0. The time unit may be an absolute time, for example, a millisecond. The time unit may alternatively be a symbol, a slot, a subframe, or the like. The terminal device may alternatively perform the first processing after N PDCCH monitoring occasions after the terminal device receives the indication information, where N is greater than or equal to 0.

In a possible design, if the indication information indicates not to monitor a PDCCH on the first serving cell and/or the at least one second serving cell, and the first serving cell and/or the at least one second serving cell include/includes a PCell, the terminal device does not monitor a PDCCH on all serving cells of the terminal device. Alternatively, if the indication information indicates not to monitor PDCCHs/a PDCCH for the first serving cell and/or the at least one second serving cell, and the first serving cell and/or the at least one second serving cell include/includes a PCell, the terminal device does not monitor a PDCCH on all serving cells of the terminal device. All the serving cells of the terminal device include a PCell and one or more configured or activated SCells of the terminal device. That the terminal device does not monitor a PDCCH on all serving cells may also be understood as that the terminal device does not monitor PDCCHs of all the serving cells.

In a possible design, after receiving the indication information, the terminal device may not monitor a PDCCH on all serving cells in the first time period.

Optionally, when performing the first processing, the terminal device may perform at least one of the following operations: The terminal device does not transmit a sounding reference signal (sounding reference signal, SRS) on a channel in the first serving cell and/or the at least one second serving cell; the terminal device does not report channel state information (channel state information, CSI) in the first serving cell and/or the at least one second serving cell; the terminal device does not transmit a physical uplink control channel (physical uplink control channel, PUCCH) in the first serving cell and/or the at least one second serving cell the terminal device sets the first serving cell and/or the at least one second serving cell to an inactive state; and the terminal device sets the first serving cell and/or the at least one second serving cell to a sleep state.

Optionally, after the first time period ends, the UE may perform at least one of the following operations: monitoring a PDCCH on the first serving cell, monitoring a PDCCH on the at least one second serving cell, monitoring a PDCCH for the first serving cell, or monitoring a PDCCH for the at least one second serving cell.

Optionally, after the first time period ends, if drx-onDurationTimer or drx-InactivityTimer is running, the UE may perform at least one of the following operations: monitoring a PDCCH on the first serving cell, monitoring a PDCCH on the at least one second serving cell, monitoring a PDCCH for the first serving cell, or monitoring a PDCCH for the at least one second serving cell.

Optionally, after the first time period ends, if drx-onDurationTimer and drx-InactivityTimer do not run, the UE may perform at least one of the following operations: not monitoring a PDCCH on the first serving cell, not monitoring a PDCCH on the at least one second serving cell, not monitoring a PDCCH for the first serving cell, or not monitoring a PDCCH for the at least one second serving cell.

Figure 3B:
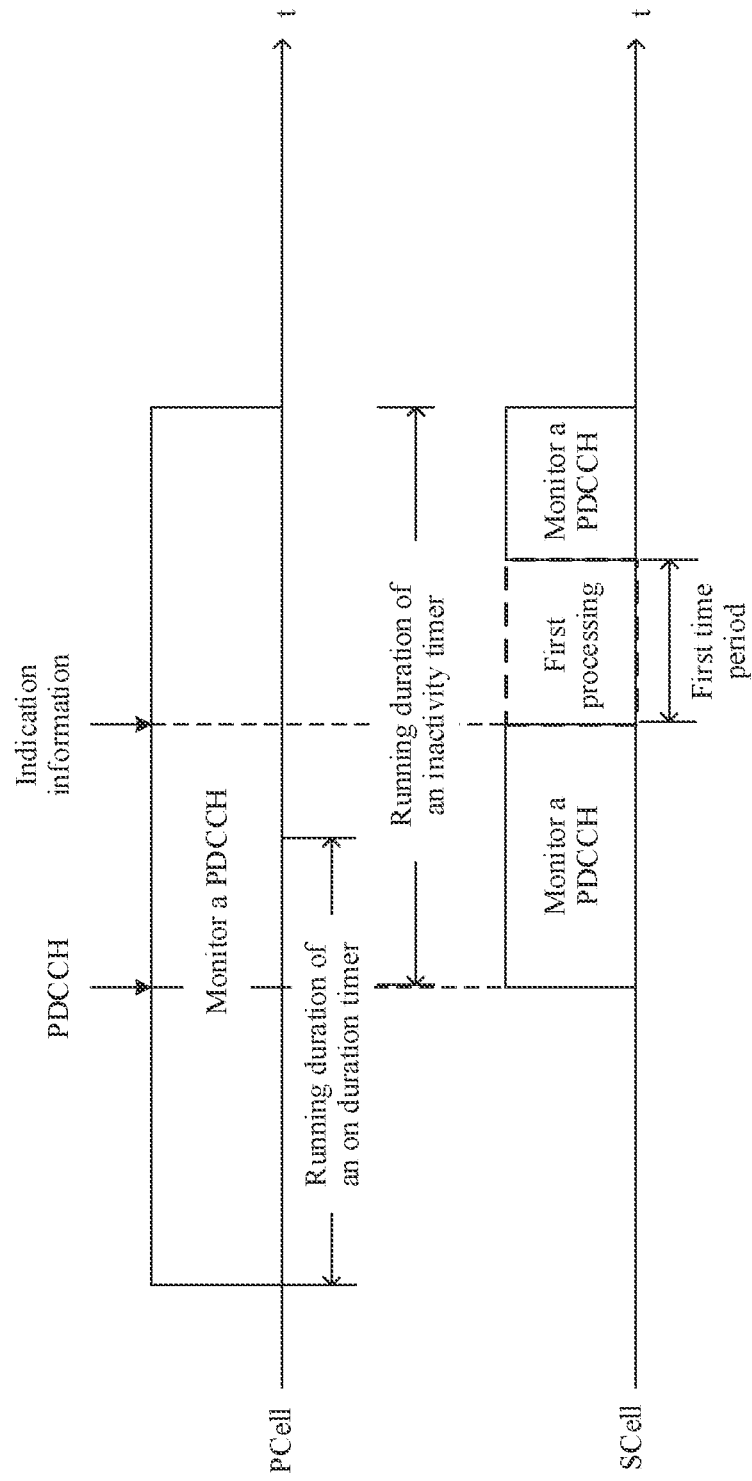
FIG. 3b is another schematic diagram of monitoring a PDCCH in a PCell and an SCell according to an embodiment of this application.

In a possible design, as shown in FIG. 3b, if an on-duration period timer (namely, drx-onDurationTimer) is running but an inactivity timer (namely, drx-InactivityTimer) does not run, the terminal device monitors a PDCCH in the PCell and/or monitors a PDCCH for the PCell, and the terminal device does not monitor a PDCCH on the SCell and/or does not monitor a PDCCH for the SCell. If drx-InactivityTimer is running, the terminal device performs at least one of the following operations: monitoring a PDCCH in the PCell, monitoring a PDCCH for the PCell, monitoring a PDCCH on the SCell, and monitoring a PDCCH for the SCell. In running duration of drx-InactivityTimer, if the terminal device receives the indication information on the first serving cell, and the indication information indicates not to monitor the PDCCH, the terminal device performs the first processing in the first time period after the terminal device receives the indication information. The first serving cell may be the PCell or the SCell, and each cell on the at least one second serving cell may be the SCell.

The terminal device performs second processing if the indication information indicates to monitor the PDCCH.

The second processing includes at least one of the following: monitoring a PDCCH on the first serving cell, monitoring a PDCCH on the at least one second serving cell, monitoring a PDCCH for the first serving cell, or monitoring a PDCCH for the at least one second serving cell.

The monitoring a PDCCH on the first serving cell includes at least one of the following: on the first serving cell, monitoring the PDCCH for the first serving cell, and on the first serving cell, monitoring a PDCCH for another serving cell of the terminal device.

The monitoring a PDCCH on the at least one second serving cell indicates that for each serving cell on the at least one second serving cell, a PDCCH for the serving cell is monitored on the serving cell, or a PDCCH for another serving cell of the terminal device is monitored on the serving cell.

The monitoring a PDCCH for the first serving cell includes at least one of the following: on the first serving cell, monitoring the PDCCH for the first serving cell, and in another serving cell of the terminal device, monitoring the PDCCH for the first serving cell.

The monitoring a PDCCH for the at least one second serving cell indicates that for each serving cell on the at least one second serving cell, a PDCCH for the serving cell is monitored on the serving cell, or a PDCCH for the serving cell is monitored on another serving cell of the terminal device.

A PDCCH for a serving cell means that transmission indicated by the PDCCH is transmission on the serving cell.

If the indication information indicates to monitor the PDCCH, the indication information is further used to indicate time information for performing the second processing. For the time information, refer to related descriptions in step 303. Details are not described herein again.

In a possible design, the indication information may include indexes/an index corresponding to the first serving cell and/or the at least one second serving cell. Alternatively, the indication information includes a bitmap used to indicate the first serving cell and/or the at least one second serving cell. For a related process, refer to the descriptions in step 303. Details are not described herein again.

In a possible design, the terminal device performs the second processing in a second time period after the terminal device receives the indication information. For a specific process, refer to related descriptions that the terminal device performs the first processing in the first time period after the terminal device receives the indication information in step 303.

In a possible design, in the second time period, if drx-onDurationTimer and drx-InactivityTimer do not run, the UE may perform at least one of the following operations: not monitoring a PDCCH on the first serving cell, not monitoring a PDCCH on the at least one second serving cell, not monitoring a PDCCH for the first serving cell, or not monitoring a PDCCH for the at least one second serving cell. If drx-onDurationTimer or drx-InactivityTimer runs, the UE may perform at least one of the following operations: monitoring a PDCCH on the first serving cell, monitoring a PDCCH on the at least one second serving cell, monitoring a PDCCH for the first serving cell, or monitoring a PDCCH for the at least one second serving cell.

In a possible design, the terminal device may perform the second processing after N time units after the terminal device receives the indication information, where N is greater than or equal to 0. The time unit may be an absolute time, for example, a millisecond. The time unit may alternatively be a symbol, a slot, a subframe, or the like. The terminal device may alternatively perform the second processing after N PDCCH monitoring occasions after the terminal device receives the indication information, where N is greater than or equal to 0.

In a possible design, if the indication information indicates to monitor a PDCCH on the first serving cell and/or the at least one second serving cell, and the first serving cell and/or the at least one second serving cell include/includes a PCell, the terminal device monitors a PDCCH on all serving cells of the terminal device. Alternatively, if the indication information indicates to monitor PDCCHs/a PDCCH for the first serving cell and/or the at least one second serving cell, and the first serving cell and/or the at least one second serving cell include/includes a PCell, the terminal device monitors a PDCCH on all serving cells of the terminal device. All the serving cells of the terminal device include a PCell and one or more configured or activated SCells of the terminal device. That the terminal device monitors a PDCCH on all serving cells may also be understood as that the terminal device monitors PDCCHs of all the serving cells.

In a possible design, after receiving the indication information, the terminal device may monitor a PDCCH on all serving cells in the second time period.

In addition, the terminal device performs the second processing if the indication information indicates not to monitor the PDCCH but at least one of the following cases occurs. (1) A downlink retransmission timer is in a running state. For example, the downlink retransmission timer may be drx-RetransmissionTimerDL. (2) An uplink retransmission timer is in a running state. For example, the uplink retransmission timer may be drx-RetransmissionTimerUL. (3) A scheduling request (scheduling request, SR) sent by the terminal device is in a pending state. (4) After successfully receiving a random access response (random access response, RAR), the terminal device does not receive a PDCCH indicating new transmission. The PDCCH indicating new transmission is scrambled by using a cell radio network temporary identity C-RNTI, the RAR is a response to a target random access preamble, and the target random access preamble does not belong to a contention-based random access preamble.

Optionally, when the terminal device performs the second processing, the terminal device activates the first serving cell and/or the at least one second serving cell.

Optionally, after the second time period ends, the UE may perform at least one of the following operations: not monitoring a PDCCH on the first serving cell, not monitoring a PDCCH on the at least one second serving cell, not monitoring a PDCCH for the first serving cell, or not monitoring a PDCCH for the at least one second serving cell.

Optionally, after the second time period ends, if drx-onDurationTimer or drx-InactivityTimer is running, the UE may continue to perform the second processing.

Optionally, after the second time period ends, if drx-onDurationTimer and drx-InactivityTimer do not run, the UE may perform at least one of the following operations: not monitoring a PDCCH on the first serving cell, not monitoring a PDCCH on the at least one second serving cell, not monitoring a PDCCH for the first serving cell, or not monitoring a PDCCH for the at least one second serving cell.

Figure 3C:
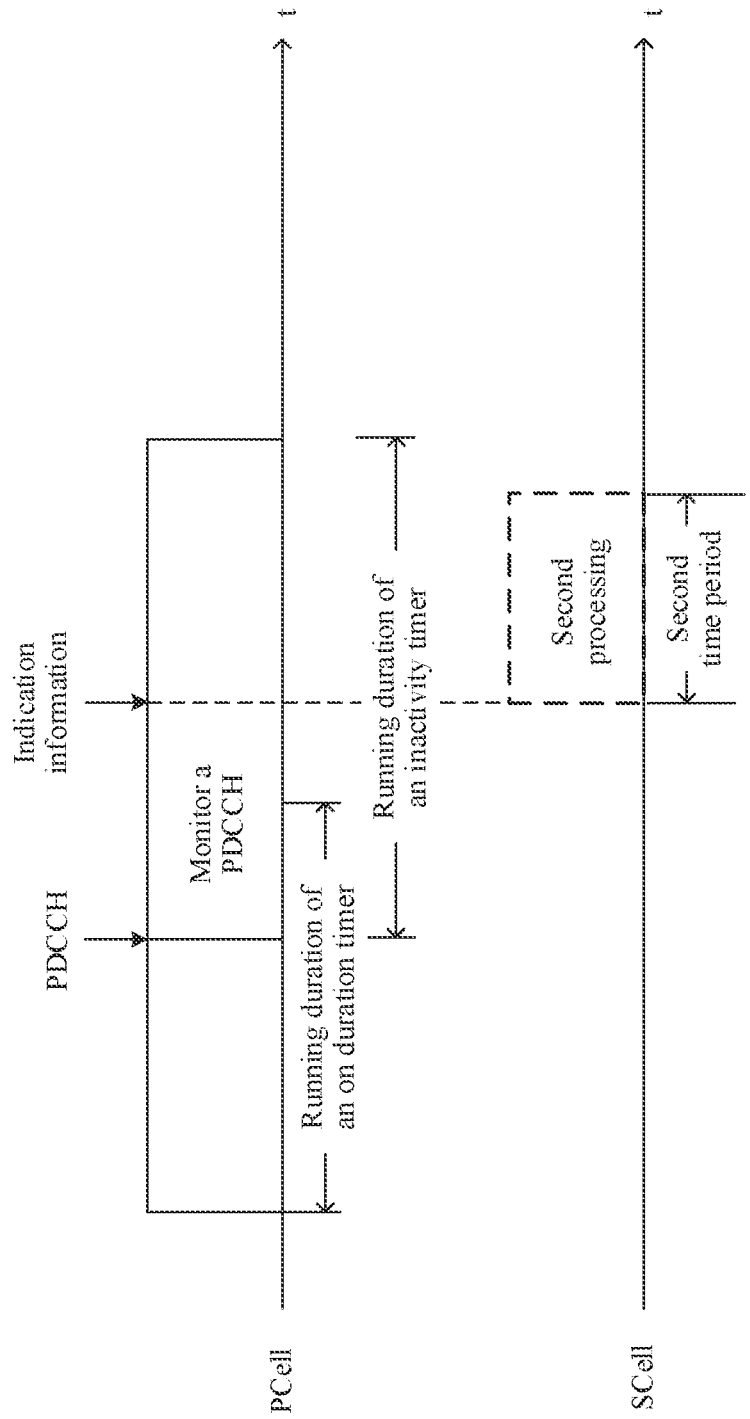
FIG. 3c is still another schematic diagram of monitoring a PDCCH in a PCell and an SCell according to an embodiment of this application.

In a possible design, as shown in FIG. 3c, before the terminal device receives the indication information on the first serving cell, if drx-onDurationTimer or drx-InactivityTimer is running, the terminal device monitors a PDCCH on the PCell and/or monitors a PDCCH for the PCell, and the terminal device does not monitor a PDCCH on the SCell and/or does not monitor a PDCCH for the SCell. In running duration of drx-InactivityTimer, if the terminal device receives the indication information on the first serving cell, and the indication information indicates to monitor the PDCCH, the terminal device performs the second processing in the second time period after the terminal device receives the indication information. The first serving cell may be the PCell or the SCell, and each cell on the at least one second serving cell may be the SCell.

According to the solution provided in this embodiment of this application, after the terminal device receives the indication information on the first serving cell, if the indication information indicates not to monitor the PDCCH, the terminal device may perform the first processing, that is, correspondingly not monitor the PDCCH, to reduce power consumption of monitoring the PDCCH by the terminal device.

Figure 4:
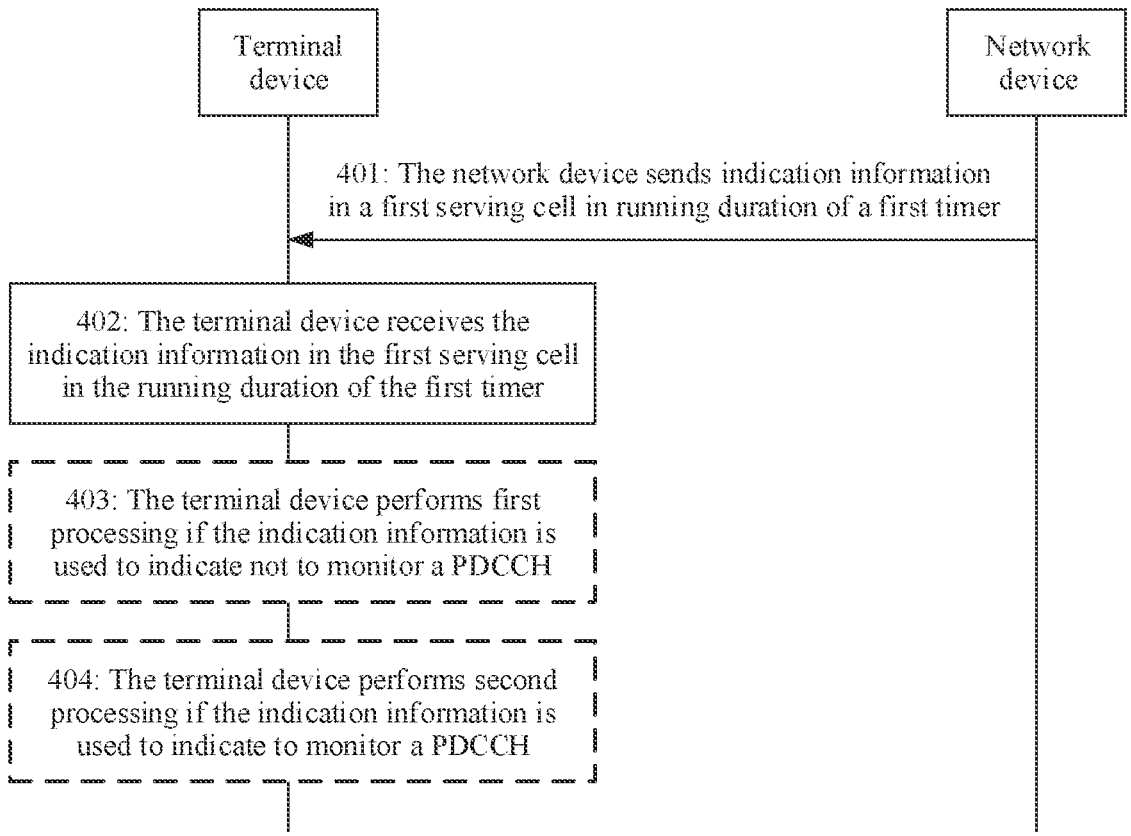
FIG. 4 is another schematic diagram of signal interaction in a wireless communications method according to an embodiment of this application.

Another embodiment of this application provides a wireless communications method. As shown in FIG. 4, the method includes the following steps.

401: A network device sends indication information on a first serving cell in running duration of a first timer.

For the indication information, refer to related descriptions in step 301. Details are not described herein again.

402: A terminal device receives the indication information on the first serving cell in the running duration of the first timer.

The first timer is configured to determine a time length for monitoring a PDCCH by the terminal device after the terminal device receives the PDCCH. Alternatively, the first timer is configured to determine a time length for monitoring a PDCCH by the terminal device in a DRX cycle. Alternatively, the first timer is configured to determine a time length of on-duration period (On-duration period) of a DRX cycle.

For example, the first timer may be drx-onDurationTimer or drx-InactivityTimer.

The terminal device performs step 403 if the indication information indicates not to monitor the PDCCH. The terminal device performs step 404 if the indication information indicates to monitor the PDCCH.

403: The terminal device performs first processing if the indication information indicates not to monitor the PDCCH.

After the terminal device receives the indication information, the terminal device performs the first processing in (current) running duration of the first timer, or in (current) running duration of the first timer and in running duration after n consecutive times that the first timer is started, or in running duration after n consecutive times that the first timer is started after (current) running duration of the first timer. Herein, n is an integer greater than or equal to 1. For example, n is 2, 3, 4, or 5. For the first processing, refer to related descriptions in step 303. Details are not described herein again.

Figure 4A:
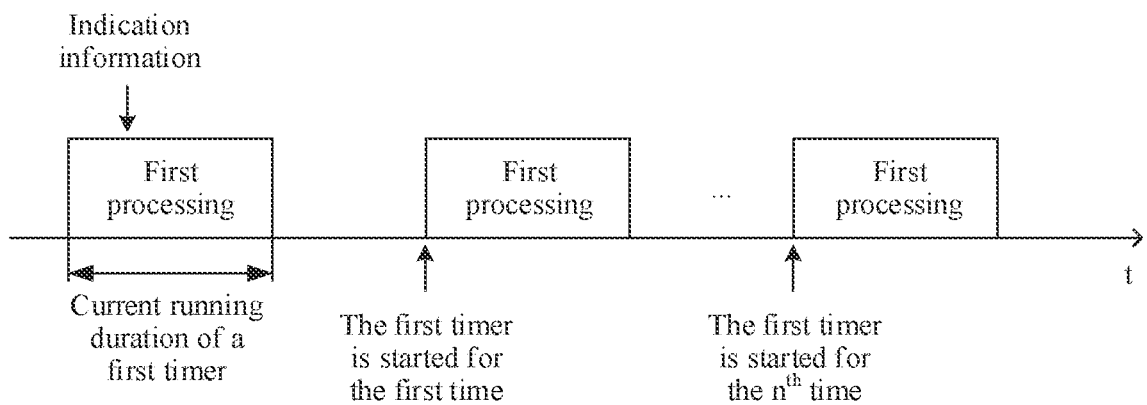
FIG. 4a is a schematic diagram of performing first processing based on indication information according to an embodiment of this application.

For example, as shown in FIG. 4a, if the terminal device receives the indication information in the running duration of the first timer (for example, drx-onDurationTimer), after receiving the indication information, the terminal device may perform the first processing in current running duration of drx-onDurationTimer; or perform the first processing in current running duration of drx-onDurationTimer and in running duration after n consecutive times that drx-onDurationTimer is started, that is, perform the first processing in the current running duration of drx-onDurationTimer and running duration in each of running duration after drx-onDurationTimer is started for the first time (namely, next startup after the current running duration of drx-onDurationTimer ends) to running duration after drx-onDurationTimer is started for the $n^{th}$ time; or perform the first processing in running duration after n consecutive times that drx-onDurationTimer is started after current running duration of drx-onDurationTimer, that is, perform the first processing in each of running duration after drx-onDurationTimer is started for the first time after the current running duration of drx-onDurationTimer ends to running duration after drx-onDurationTimer is started for the $n^{th}$ time.

Optionally, when the first timer is drx-onDurationTimer, after drx-onDurationTimer is started for the first time (namely, next startup after current running duration of drx-onDurationTimer ends) or after drx-onDurationTimer is started for the $n^{th}$ time, the UE may perform at least one of the following operations: monitoring a PDCCH on the first serving cell, monitoring a PDCCH on the at least one second serving cell, monitoring a PDCCH for the first serving cell, or monitoring a PDCCH for the at least one second serving cell.

If the terminal device receives the indication information when drx-onDurationTimer runs but drx-InactiveTimer does not run, after receiving the indication information, the terminal device may perform the first processing in current running duration of drx-onDurationTimer; or perform the first processing in current running duration of drx-onDurationTimer and in running duration after n consecutive times that drx-onDurationTimer is started; or perform the first processing in running duration after n consecutive times that drx-onDurationTimer is started after current running duration of drx-onDurationTimer.

Optionally, after receiving the indication information in the running duration of the first timer, the terminal device may stop the first timer and perform the first processing.

Optionally, the terminal device may stop the first timer after N time units after the terminal device receives the indication information, where N is greater than or equal to 0. The time unit may be an absolute time, for example, a millisecond. The time unit may alternatively be a symbol, a slot, a subframe, or the like. The terminal device may alternatively stop the first timer after N PDCCH monitoring occasions after the terminal device receives the indication information, where N is greater than or equal to 0.

When the first timer is drx-onDurationTimer, the terminal device may stop drx-onDurationTimer after receiving the indication information in the running duration of drx-onDurationTimer. Optionally, the terminal device stops drx-onDurationTimer after N time units after the terminal device receives the indication information. The terminal device may alternatively stop drx-onDurationTimer after N PDCCH monitoring occasions after the terminal device receives the indication information.

In a possible design, if the indication information indicates not to monitor a PDCCH on the first serving cell and/or the at least one second serving cell, or if the indication information indicates not to monitor PDCCHs/a PDCCH for the first serving cell and/or the at least one second serving cell, when the first serving cell and/or the at least one second serving cell include/includes a PCell, the terminal device stops the first timer after receiving the indication information; or when the first serving cell and/or the at least one second serving cell do/does not include a PCell, the terminal device may not stop the first timer after receiving the indication information.

For example, when the first timer is drx-onDurationTimer, if the indication information indicates not to monitor a PDCCH on the first serving cell and/or the at least one second serving cell, or if the indication information indicates not to monitor PDCCHs/a PDCCH for the first serving cell and/or the at least one second serving cell, when the first serving cell and/or the at least one second serving cell include/includes a PCell, the terminal device stops drx-onDurationTimer after receiving the indication information; or when the first serving cell and/or the at least one second serving cell do/does not include a PCell, the terminal device may not stop drx-onDurationTimer after receiving the indication information.

When the first timer is drx-InactivityTimer, if the terminal device receives the indication information in running duration of drx-InactivityTimer, after receiving the indication information, the terminal device may perform the first processing in current running duration of drx-InactivityTimer; or perform the first processing in current running duration of drx-InactivityTimer and in running duration after n consecutive times that drx-InactivityTimer is started; or perform the first processing in running duration after n consecutive times that drx-InactivityTimer is started after current running duration of drx-InactivityTimer.

If the terminal device receives the indication information when drx-InactivityTimer runs but drx-onDurationTimer does not run, after receiving the indication information, the terminal device may perform the first processing in current running duration of drx-InactivityTimer; or perform the first processing in current running duration of drx-Inactivity-Timer and in running duration after n consecutive times that drx-InactivityTimer is started; or perform the first processing in running duration after n consecutive times that drx-InactivityTimer is started after current running duration of drx-InactivityTimer.

If the terminal device receives the indication information when drx-InactivityTimer and drx-onDurationTimer run, after receiving the indication information, the terminal device may perform the first processing in current running duration of drx-InactivityTimer; or perform the first processing in current running duration of drx-InactivityTimer and in running duration after n consecutive times that drx-Inactivity Timer is started; or perform the first processing in running duration after n consecutive times that drx-InactivityTimer is started after current running duration of drx-InactivityTimer.

Optionally, after receiving the indication information in running duration of drx-InactivityTimer, the terminal device may stop drx-InactivityTimer. The terminal device may stop drx-InactivityTimer after N time units after the terminal device receives the indication information. The terminal device may alternatively stop drx-InactivityTimer after N PDCCH monitoring occasions after the terminal device receives the indication information.

When the first timer is drx-InactivityTimer, if the indication information indicates not to monitor a PDCCH on the first serving cell and/or the at least one second serving cell, or if the indication information indicates not to monitor PDCCHs/a PDCCH for the first serving cell and/or the at least one second serving cell, when the first serving cell and/or the at least one second serving cell include/includes a PCell, the terminal device stops drx-InactivityTimer after receiving the indication information; or when the first serving cell and/or the at least one second serving cell do/does not include a PCell, the terminal device may not stop drx-InactivityTimer after receiving the indication information.

Optionally, after drx-Inactivity Timer stops, if drx-onDurationTimer is running, in running duration of drx-onDurationTimer, the UE may perform at least one of the following operations: monitoring a PDCCH on the first serving cell, monitoring a PDCCH on the at least one second serving cell, monitoring a PDCCH for the first serving cell, or monitoring a PDCCH for the at least one second serving cell.

In a possible design, if the indication information indicates not to monitor a PDCCH on the first serving cell and/or the at least one second serving cell, and the first serving cell and/or the at least one second serving cell include/includes a PCell, the terminal device does not monitor a PDCCH on all serving cells of the terminal device. If the indication information indicates not to monitor PDCCHs/a PDCCH for the first serving cell and/or the at least one second serving cell, and the first serving cell and/or the at least one second serving cell include/includes a PCell, the terminal device does not monitor a PDCCH on all serving cells of the terminal device. All the serving cells of the terminal device include a PCell and one or more configured or activated SCells of the terminal device. That the terminal device does not monitor a PDCCH on all serving cells may also be understood as that the terminal device does not monitor PDCCHs of all the serving cells.

Optionally, after receiving the indication information, the terminal device may not monitor a PDCCH on all serving cells in the running duration of the first timer, or in the running duration of the first timer and in running duration after n consecutive times that the first timer is started, or in running duration after n consecutive times that the first timer is started after the running duration of the first timer.

Optionally, when performing the first processing, the terminal device may perform at least one of the following operations: The terminal device does not transmit an SRS in the first serving cell and/or the at least one second serving cell; the terminal device does not report CSI in the first serving cell and/or the at least one second serving cell; the terminal device does not transmit a PUCCH in the first serving cell and/or the at least one second serving cell; the terminal device sets the first serving cell and/or the at least one second serving cell to an inactive state; and the terminal device sets the first serving cell and/or the at least one second serving cell to a sleep state.

Figure 4B:
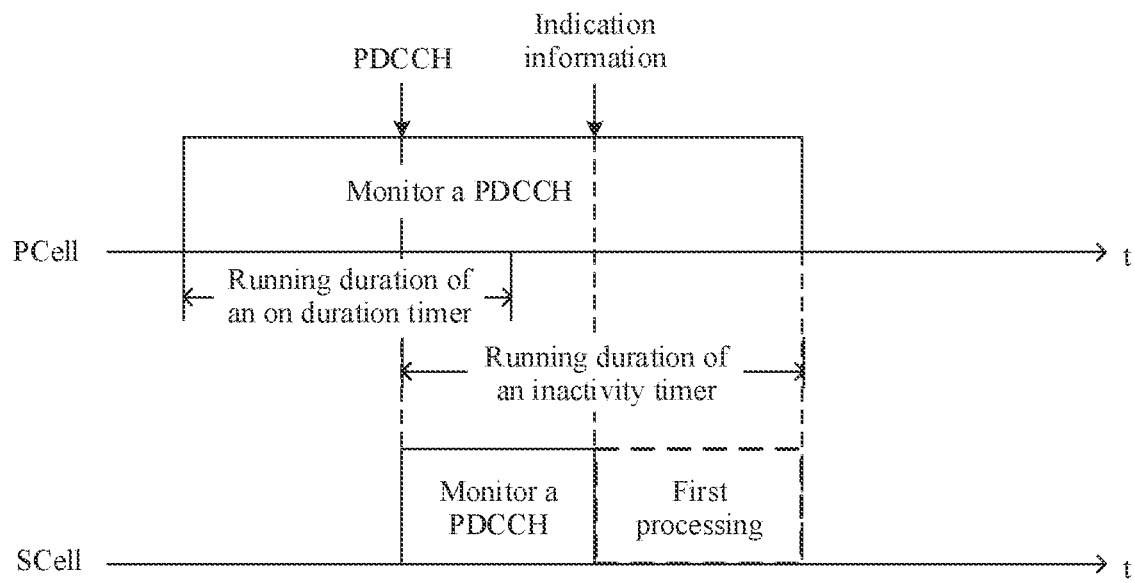
FIG. 4b is another schematic diagram of performing first processing based on indication information according to an embodiment of this application.

In a possible design, as shown in FIG. 4b, if drx-onDurationTimer is running but drx-InactivityTimer does not run, the terminal device monitors a PDCCH on the PCell and/or monitors a PDCCH for the PCell, and the terminal device does not monitor a PDCCH on the SCell and/or does not monitor a PDCCH for the SCell. If drx-InactivityTimer is running, the terminal device performs at least one of the following operations: monitoring a PDCCH on the PCell, monitoring a PDCCH for the PCell, monitoring a PDCCH on the SCell and monitoring a PDCCH for the SCell. In running duration of drx-InactivityTimer, if the terminal device receives the indication information on the first serving cell, and the indication information indicates not to monitor the PDCCH, the terminal device may perform the first processing in current running duration of drx-InactivityTimer after receiving the indication information. The first serving cell may be the PCell or the SCell, and each cell on the at least one second serving cell may be the SCell.

404: The terminal device performs second processing if the indication information indicates to monitor the PDCCH.

After the terminal device receives the indication information, the terminal device performs the second processing in (current) running duration of the first timer, or in (current) running duration of the first timer and in running duration after m consecutive times that the first timer is started, or in running duration after m consecutive times that the first timer is started after (current) running duration of the first timer, where m is an integer greater than or equal to 1. For the second processing, refer to related descriptions in step 304. Details are not described herein again.

For example, when the first timer is drx-onDurationTimer, if the terminal device receives the indication information in running duration of drx-onDurationTimer, after receiving the indication information, the terminal device may perform the second processing in current running duration of drx-onDurationTimer; or perform the second processing in current running duration of drx-onDurationTimer and in running duration after n consecutive times that drx-onDurationTimer is started; or perform the second processing in running duration after n consecutive times that drx-onDurationTimer is started after current running duration of drx-onDurationTimer.

Optionally, if the terminal device receives the indication information when drx-onDurationTimer runs but drx-InactivityTimer does not run, after the terminal device receives the indication information, the terminal device may perform the second processing in current running duration of drx-onDurationTimer; or perform the second processing in current running duration of drx-onDurationTimer and in running duration after n consecutive times that drx-onDurationTimer is started; or perform the second processing in running duration after n consecutive times that drx-onDurationTimer is started after current running duration of drx-onDurationTimer.

When the first timer is drx-InactivityTimer, if the terminal device receives the indication information in running duration of drx-InactivityTimer, after receiving the indication information, the terminal device may perform the second processing in current running duration of drx-InactivityTimer; or perform the second processing in current running duration of drx-InactivityTimer and in running duration after n consecutive times that drx-InactivityTimer is started; or perform the second processing in running duration after n consecutive times that drx-InactivityTimer is started after current running duration of drx-InactivityTimer.

Optionally, if the terminal device receives the indication information when drx-InactivityTimer runs but drx-onDurationTimer does not run, after the terminal device receives the indication information, the terminal device may perform the second processing in current running duration of drx-InactivityTimer; or perform the second processing in current running duration of drx-InactivityTimer and in running duration after n consecutive times that drx-Inactivity Timer is started; or perform the second processing in running duration after n consecutive times that drx-InactivityTimer is started after current running duration of drx-InactivityTimer.

Optionally, if the terminal device receives the indication information when drx-InactivityTimer and drx-onDurationTimer run, after the terminal device receives the indication information, the terminal device may perform the second processing in current running duration of drx-InactivityTimer; or perform the second processing in current running duration of drx-InactivityTimer and in running duration after n consecutive times that drx-InactivityTimer is started; or perform the second processing in running duration after n consecutive times that drx-InactivityTimer is started after current running duration of drx-InactivityTimer.

In a possible design, if the indication information indicates to monitor a PDCCH on the first serving cell and/or the at least one second serving cell, and the first serving cell and/or the at least one second serving cell include/includes a PCell, the terminal device monitors a PDCCH on all serving cells of the terminal device. Alternatively, if the indication information indicates to monitor PDCCHs/a PDCCH for the first serving cell and/or the at least one second serving cell, and the first serving cell and/or the at least one second serving cell include/includes a PCell, the terminal device monitors a PDCCH on all serving cells of the terminal device. All the serving cells of the terminal device include a PCell and one or more configured or activated SCells of the terminal device. That the terminal device monitors a PDCCH on all serving cells may also be understood as that the terminal device monitors PDCCHs of all the serving cells.

Optionally, after receiving the indication information, the terminal device may monitor a PDCCH on all serving cells in the running duration of the first timer, or in the running duration of the first timer and in running duration after n consecutive times that the first timer is started or in running duration after n consecutive times that the first timer is started after the running duration of the first timer.

In addition, the terminal device performs the second processing if the indication information indicates not to monitor the PDCCH but at least one of the following cases occurs, (1) A downlink retransmission timer is in a running state. For example, the downlink retransmission timer may be drx-RetransmissionTimerDL. (2) An uplink retransmission timer is in a running state. For example, the uplink retransmission timer may be drx-RetransmissionTimerUL (3) An SR sent by the terminal device is in a pending state. (4) After successfully receiving an RAR, the terminal device does not receive a PDCCH indicating new transmission. The PDCCH indicating new transmission is scrambled by using a cell radio network temporary identity C-RNTI, the RAR is a response to a target random access preamble, and the target random access preamble does not belong to a contention-based random access preamble.

In addition, after the terminal device receives the indication information in non-running duration (for example, before the first timer runs) of the first timer, the terminal device may perform the second processing in the running duration of the first timer, or in the running duration of the first timer and in running duration after m consecutive times that the first timer is started, or in running duration after m consecutive times that the first timer is started after the running duration of the first timer.

Optionally, when the terminal device performs the second processing, the terminal device activates the first serving cell and/or the at least one second serving cell.

According to the solution provided in this embodiment of this application, after the terminal device receives the indication information on the first serving cell, if the indication information indicates not to monitor the PDCCH, the terminal device may perform the first processing, that is, correspondingly not monitor the PDCCH, to reduce power consumption of monitoring the PDCCH by the terminal device.

Figure 5:
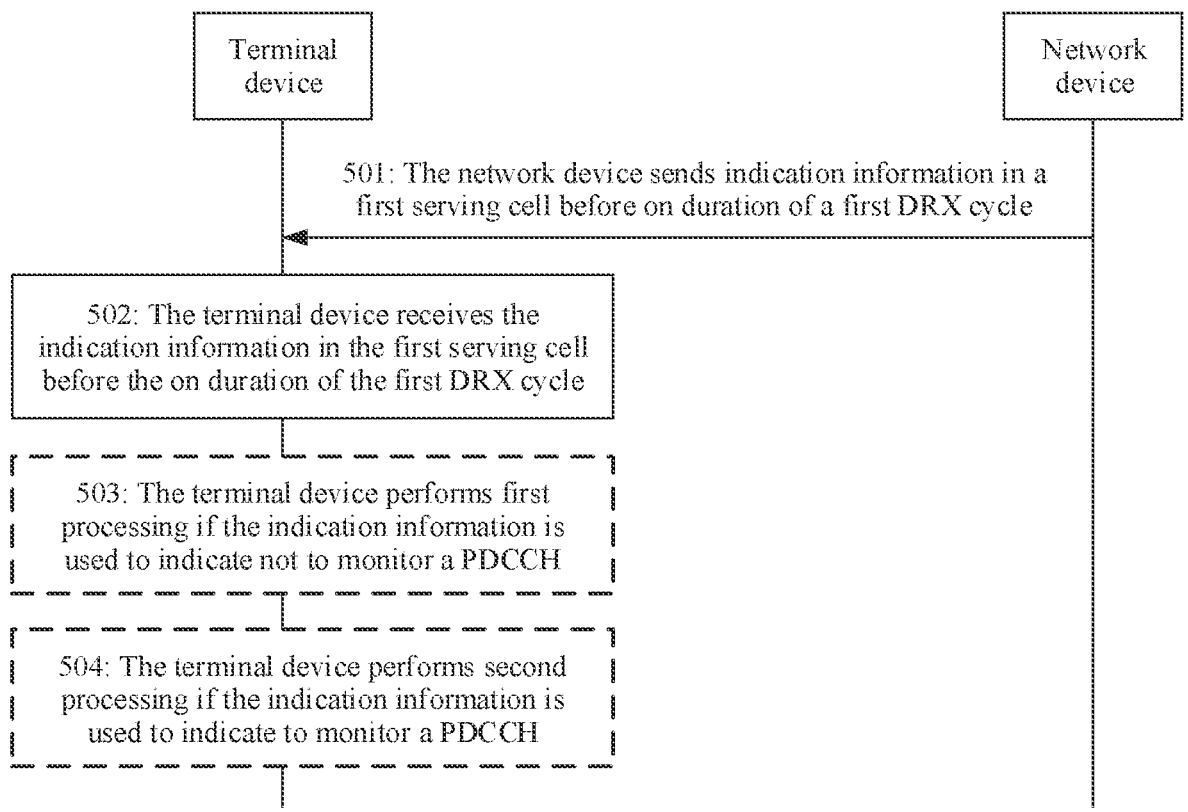
FIG. 5 is still another schematic diagram of signal interaction in a wireless communications method according to an embodiment of this application.

Still another embodiment of this application provides a wireless communications method. As shown in FIG. 5, the method includes the following steps.

501: A network device sends indication information on a first serving cell before on-duration period of a first DRX cycle.

In other words, the network device sends the indication information on the first serving cell before the on-duration period of the first DRX cycle.

Optionally, the network device may send the indication information in on-duration period of a DRX cycle.

For the indication information, refer to related descriptions in step 301. Details are not described herein again.

502: A terminal device receives the indication information on the first serving cell before the on-duration period of the first DRX cycle.

In other words, the terminal device receives the indication information on the first serving cell before the on-duration period of the first DRX cycle.

Optionally, the terminal device may receive the indication information in on-duration period of a DRX cycle.

The terminal device performs step 503 if the indication information indicates not to monitor a PDCCH. The terminal device performs step 504 if the indication information indicates to monitor a PDCCH.

503: The terminal device performs first processing if the indication information indicates not to monitor the PDCCH.

After receiving the indication information, the terminal device performs the first processing in one or more segments of on-duration period. It may also be understood that after receiving the indication information, the terminal device performs the first processing in one or more DRX cycles. For the first processing, refer to related descriptions in step 303. Details are not described herein again.

Figure 5A:
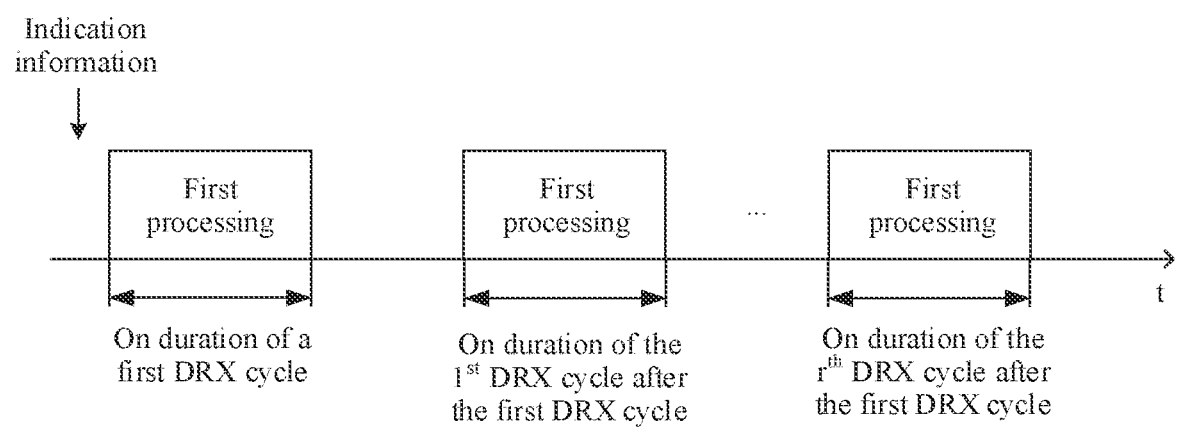
FIG. 5a is a schematic diagram of performing first processing based on indication information according to an embodiment of this application.

As shown in FIG. 5a, after receiving the indication information before the on-duration period of the first DRX cycle, the terminal device may perform the first processing in the on-duration period of the first DRX cycle; or may perform the first processing in the on-duration period of the first DRX cycle and in on-duration period of at least one DRX cycle after the first DRX cycle, that is, perform the first processing in the on-duration period of the first DRX cycle and on-duration period of each of the DRX cycle (namely, a next DRX cycle after the first DRX cycle) to the $r^{th}$ DRX cycle after the first DRX cycle; or may perform the first processing in on-duration period of at least one DRX cycle after the first DRX cycle, that is, perform the first processing in on-duration period of each of the $1^{st}$ DRX cycle to the $r^{th}$ DRX cycle after the first DRX cycle. Herein, r is an integer greater than or equal to 1.

In a possible design, if the indication information indicates not to monitor a PDCCH on the first serving cell and/or the at least one second serving cell, and the first serving cell and/or the at least one second serving cell include/includes a PCell, the terminal device does not monitor a PDCCH on all serving cells of the terminal device. If the indication information indicates not to monitor PDCCHs/a PDCCH for the first serving cell and/or the at least one second serving cell, and the first serving cell and/or the at least one second serving cell include/includes a PCell, the terminal device does not monitor a PDCCH on all serving cells of the terminal device. All the serving cells of the terminal device include a PCell and one or more configured or activated SCells of the terminal device. That the terminal device does not monitor a PDCCH on all serving cells may also be understood as that the terminal device does not monitor PDCCHs of all the serving cells.

Optionally, after receiving the indication information, the terminal device may not monitor a PDCCH on all serving cells in the on-duration period of the first DRX cycle; or may not monitor a PDCCH on all serving cells in the on-duration period of the first DRX cycle and in on-duration period of at least one DRX cycle after the first DRX cycle; or may not monitor a PDCCH on all serving cells in on-duration period of at least one DRX cycle after the first DRX cycle.

Optionally, when performing the first processing, the terminal device may perform at least one of the following operations: The terminal device does not transmit an SRS in the first serving cell and/or the at least one second serving cell; the terminal device does not report CSI in the first serving cell and/or the at least one second serving cell; the terminal device does not transmit a PUCCH in the first serving cell and/or the at least one second serving cell; the terminal device sets the first serving cell and/or the at least one second serving cell to an inactive state; and the terminal device sets the first serving cell and/or the at least one second serving cell to a sleep state.

504: The terminal device performs second processing if the indication information indicates to monitor the PDCCH.

After receiving the indication information, the terminal device performs the second processing in one or more segments of on-duration period. It may also be understood that after receiving the indication information, the terminal device performs the second processing in one or more DRX cycles. For the second processing, refer to related descriptions in step 304. Details are not described herein again.

Optionally, after receiving the indication information, the terminal device may perform the second processing in the on-duration period of the first DRX cycle; or may perform the second processing in the on-duration period of the first DRX cycle and in on-duration period of at least one DRX cycle after the first DRX cycle; or may perform the second processing in on-duration period of at least one DRX cycle after the first DRX cycle.

In a possible design, if the indication information indicates to monitor a PDCCH on the first serving cell and/or the at least one second serving cell, and the first serving cell and/or the at least one second serving cell include/includes a PCell, the terminal device monitors a PDCCH on all serving cells of the terminal device. If the indication information indicates to monitor PDCCHs/a PDCCH for the first serving cell and/or the at least one second serving cell, and the first serving cell and/or the at least one second serving cell include/includes a PCell, the terminal device monitors a PDCCH on all serving cells of the terminal device. All the serving cells of the terminal device include a PCell and one or more configured or activated SCells of the terminal device. That the terminal device monitors a PDCCH on all serving cells may also be understood as that the terminal device monitors PDCCHs of all the serving cells.

Optionally, after receiving the indication information, the terminal device may monitor a PDCCH on all serving cells in the on-duration period of the first DRX cycle; or may monitor a PDCCH on all serving cells in the on-duration period of the first DRX cycle and in on-duration period of at least one DRX cycle after the first DRX cycle; or may monitor a PDCCH on all serving cells in on-duration period of at least one DRX cycle after the first DRX cycle.

In addition, the terminal device performs the second processing if the indication information indicates not to monitor the PDCCH but at least one of the following cases occurs. (1) A downlink retransmission timer is in a running state. For example, the downlink retransmission timer may be drx-RetransmissionTimerDL. (2) An uplink retransmission timer is in a running state. For example, the uplink retransmission timer may be drx-RetransmissionTimerUL. (3) An SR sent by the terminal device is in a pending state. (4) After successfully receiving an RAR, the terminal device does not receive a PDCCH indicating new transmission. The PDCCH indicating new transmission is scrambled by using a cell radio network temporary identity C-RNTI, the RAR is a response to a target random access preamble, and the target random access preamble does not belong to a contention-based random access preamble. Optionally, at the same time when the terminal device performs the second processing, the terminal device activates the first serving cell and/or the at least one second serving cell.

According to the solution provided in this embodiment of this application, after the terminal device receives the indication information on the first serving cell, if the indication information indicates not to monitor the PDCCH, the terminal device may perform the first processing, that is, correspondingly not monitor the PDCCH, to reduce power consumption of monitoring the PDCCH by the terminal device.

The foregoing mainly describes the solutions provided in the embodiments of this application from perspectives of the terminal device and the network device. It may be understood that to implement the foregoing functions, the terminal device and the network device each include a corresponding hardware structure and/or software module for performing each function. A person skilled in the art should be easily aware that algorithm steps described with reference to the embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the terminal device and the network device may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that in the embodiments of this application, division into the modules is an example and is merely logical function division, and may be other division in an actual implementation.

Figure 6:
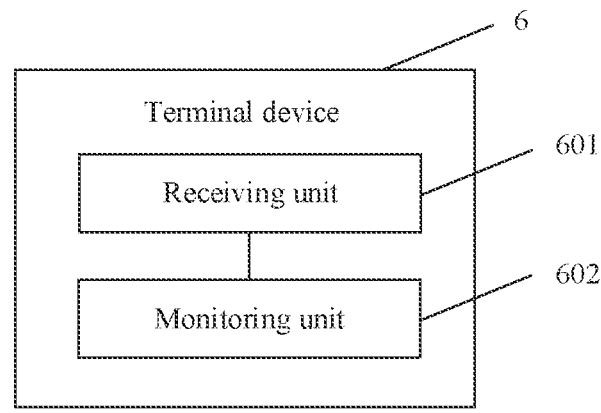
FIG. 6 is a schematic structural diagram of a terminal device according to an embodiment of this application.

When each function module is obtained through division based on each corresponding function, FIG. 6 is a possible schematic structural diagram 1 of the terminal device 6 in the foregoing embodiments. The terminal device includes a receiving unit 601 and a monitoring unit 602. In this embodiment of this application, the receiving unit 601 may be configured to receive indication information on a first serving cell. The monitoring unit 602 is configured to: perform first processing if the indication information indicates not to monitor a PDCCH, where the first processing includes at least one of the following: not monitoring a PDCCH on the first serving cell, not monitoring a PDCCH on at least one second serving cell, not monitoring a PDCCH for the first serving cell, or not monitoring a PDCCH for the at least one second serving cell; or perform second processing if the indication information indicates to monitor a PDCCH, where the second processing includes at least one of the following: monitoring a PDCCH on the first serving cell, monitoring a PDCCH on at least one second serving cell, monitoring a PDCCH for the first serving cell, or monitoring a PDCCH for the at least one second serving cell. The receiving unit 601 is configured to support the terminal device in performing the process 302 in FIG. 1 the process 402 in FIG. 4, and the process 502 in FIG. 5. The monitoring unit 602 is configured to support the terminal device in performing the process 303 or 304 in FIG. 3, the process 403 or 404 in FIG. 4, and the process 503 or 504 in FIG. 5.

Figure 7:
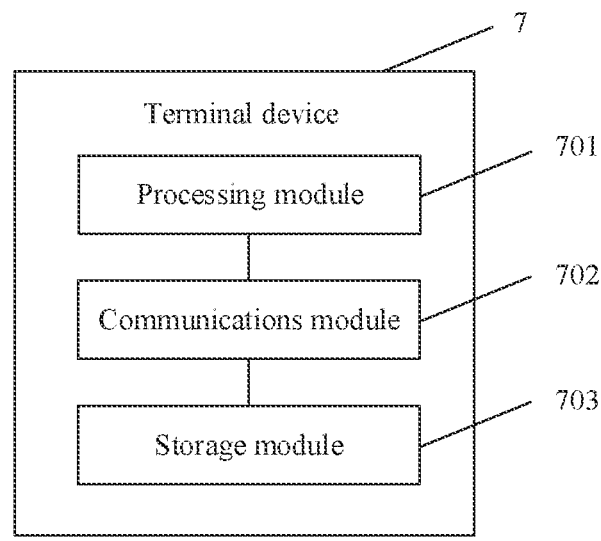
FIG. 7 is another schematic structural diagram of a terminal device according to an embodiment of this application.

When an integrated unit is used, FIG. 7 is a possible schematic structural diagram 2 of the terminal device in the foregoing embodiments. In this application, the terminal device may include a processing module 701, a communications module 702, and a storage module 703. The processing module 701 is configured to control hardware apparatuses, application software, and the like of the terminal device. The communications module 702 is configured to: accept an instruction and/or data sent by another device, or send data of the terminal device to another device. The storage module 703 is configured to store a software program of the terminal device, store data, run software, and the like. The processing module 701 may be a determining unit or a controller, for example, may be a central determining unit (central processing unit, CPU), a general purpose determining unit, a digital signal determining unit (digital signal processor, DSP), an application-specific integrated circuit (application-specific integrated circuit, ASIC), a field programmable gate array (Field Programmable Gate Array, FPGA), another programmable logic device, a transistor logic device, a hardware component, or any combination thereof. The determining unit may implement or execute various example logical blocks, modules, and circuits described with reference to content disclosed in this application. The determining unit may alternatively be a combination implementing a computing function, for example, a combination of one or more micro monitoring units, or a combination of a DSP and a micro monitoring unit. The communications module 702 may be a transceiver, a transceiver circuit, a communications interface, or the like. The storage module 703 may be a memory.

Figure 8:
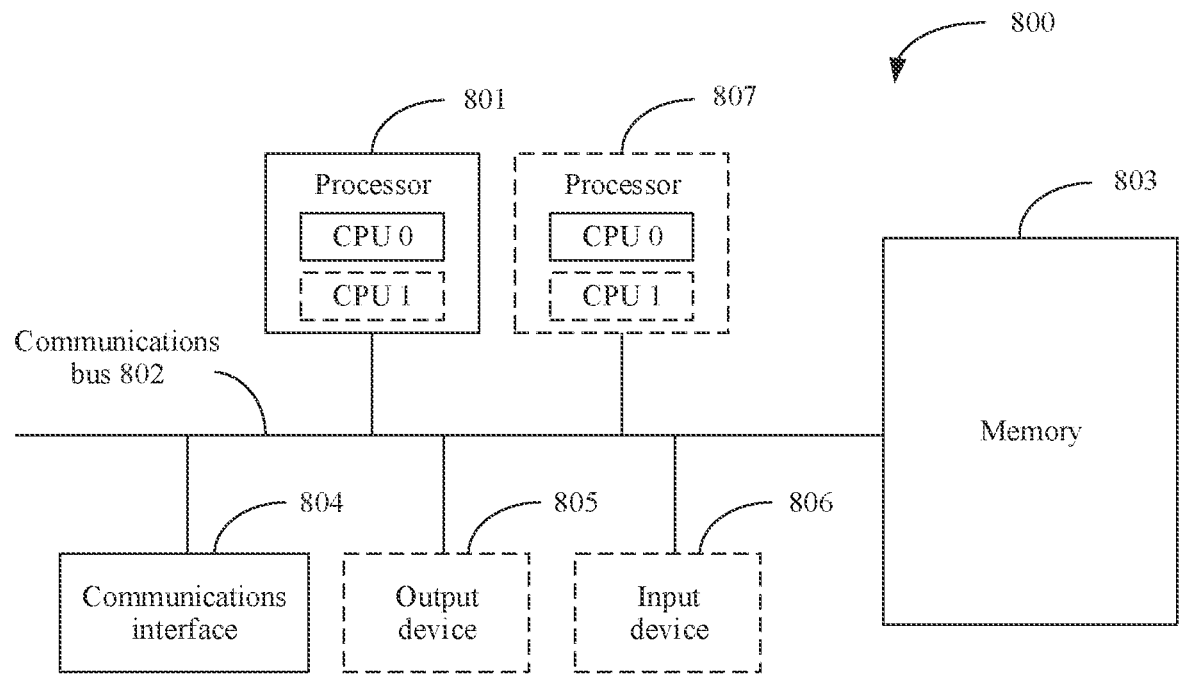
FIG. 8 is still another schematic structural diagram of a terminal device according to an embodiment of this application.

In a possible design, the terminal device may be implemented by using a structure (an apparatus or a system) in FIG. 8.

FIG. 8 is a schematic diagram of a structure according to an embodiment of this application. The structure 800 includes at least one processor 801, a communications bus 802, a memory 803, and at least one communications interface 804.

The processor 801 may be a CPU, a micro monitoring unit, an ASIC, or one or more integrated circuits configured to control program execution in the solutions of this application.

The communications bus 802 may include a path for transmitting information between the foregoing components.

The communications interface 804 is any apparatus such as a transceiver, and is configured to communicate with another device or a communications network such as the Ethernet, a radio access network (radio access network, RAN), or a wireless local area network (wireless local area networks, WLAN).

The memory 803 may be a read-only memory (read-only memory, ROM), another type of static storage device that can store static information and instructions, a random access memory (random access memory, RAM), or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, and the like), a magnetic disk storage medium, another magnetic storage device, or any other medium that can be configured to carry or store expected program code in a form of an instruction or a data structure and that can be accessed by a computer. However, the memory 302 is not limited thereto. The memory may exist independently, and is connected to the determining unit by using the bus. Alternatively, the memory may be integrated into the determining unit.

The memory 803 is configured to store application code for executing the solutions in this application, and the processor 801 controls the execution. The processor 801 is configured to execute the application code stored in the memory 803, to implement a function in the method in this patent.

In specific implementation, in an embodiment, the processor 801 may include one or more CPUs, for example, a CPU 0 and a CPU 1 in FIG. 8.

In specific implementation, in an embodiment, the structure 800 may include a plurality of processors, for example, the processor 801 and a processor 807 in FIG. 8. Each of the processors may be a single-core processor (single-CPU), or may be a multi-core processor (multi-CPU). The processor herein may be one or more devices, circuits, and/or processing cores for processing data (for example, a computer program instruction).

In specific implementation, in an embodiment, the structure 800 may further include an output device 805 and an input device 806. The output device 805 communicates with the processor 801, and may display information in a plurality of manners. For example, the output device 805 may be a liquid crystal display (liquid crystal display, LCD), a light emitting diode (light emitting diode, LED) display device, a cathode ray tube (cathode ray tube, CRT) display device, or a projector (projector). The input device 806 communicates with the processor 801, and may accept input of a user in a plurality of manners. For example, the input device 806 may be a mouse, a keyboard, a touchscreen device, or a sensing device.

In specific implementation, the structure 800 may be a desktop computer, a portable computer, a network server, a palmtop computer (personal digital assistant, PDA), a mobile phone, a tablet computer, a wireless terminal device, a communications device, an embedded device, or a device with a structure similar to that in FIG. 8. A type of the structure 800 is not limited in this embodiment of this application.

Figure 9:
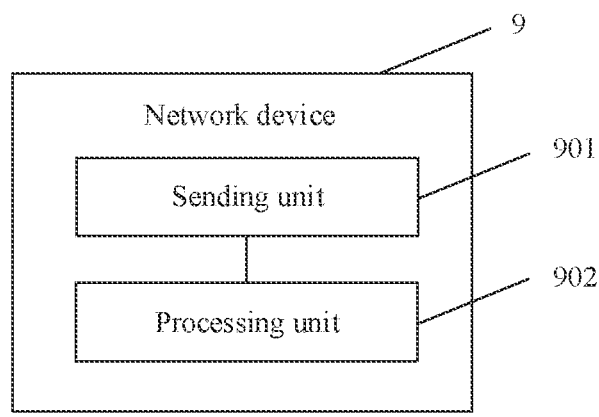
FIG. 9 is a schematic structural diagram of a network device according to an embodiment of this application.

When each function module is obtained through division based on each corresponding function, FIG. 9 is a possible schematic structural diagram 7 of the network device 9 in the foregoing embodiments. The network device includes a sending unit 901 and a processing unit 902. In this embodiment of this application, the sending unit 901 is configured to send indication information on a first serving cell; and the processing unit 902 is configured to: perform third processing by using the sending unit if the indication information indicates not to monitor a PDCCH, where the third processing includes at least one of the following: not sending a PDCCH on the first serving cell, not sending a PDCCH on at least one second serving cell, not sending a PDCCH for the first serving cell, or not sending a PDCCH for the at least one second serving cell; or perform fourth processing if the indication information indicates to monitor a PDCCH, where the fourth processing includes at least one of the following: sending a PDCCH on the first serving cell, sending a PDCCH on the at least one second serving cell, sending a PDCCH for the first serving cell, or sending a PDCCH for the at least one second serving cell. The sending unit 901 is configured to support the network device in performing the process 301 in FIG. 3, the process 401 in FIG. 4, and the process 501 in FIG. 5.

Figure 10:
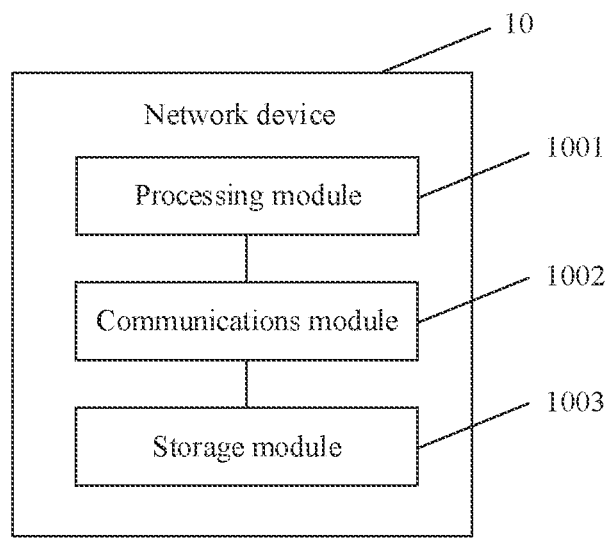
FIG. 10 is another schematic structural diagram of a network device according to an embodiment of this application.

When an integrated unit is used, FIG. 10 is a possible schematic structural diagram 2 of the network device in the foregoing embodiments. In this application, the network device may include a processing module 1001, a communications module 1002, and a storage module 1003. The processing module 1001 is configured to control hardware apparatuses, application software, and the like of the network device. The communications module 1002 is configured to: accept an instruction sent by another device, or send data of the network device to another device. The storage module 1003 is configured to store a software program of the network device, store data, run software, and the like. The processing module 1001 may be a determining unit or a controller, for example, may be a CPU, a general purpose determining unit, a DSP, an ASIC, an FPGA, another programmable logic device, a transistor logic device, a hardware component, or any combination thereof. The determining unit may implement or execute various example logical blocks, modules, and circuits described with reference to content disclosed in this application. The determining unit may alternatively be a combination implementing a computing function, for example, a combination of one or more micro monitoring units, or a combination of a DSP and a micro monitoring unit. The communications module 1002 may be a transceiver, a transceiver circuit, a communications interface, or the like. The storage module 1003 may be a memory.

Figure 11:
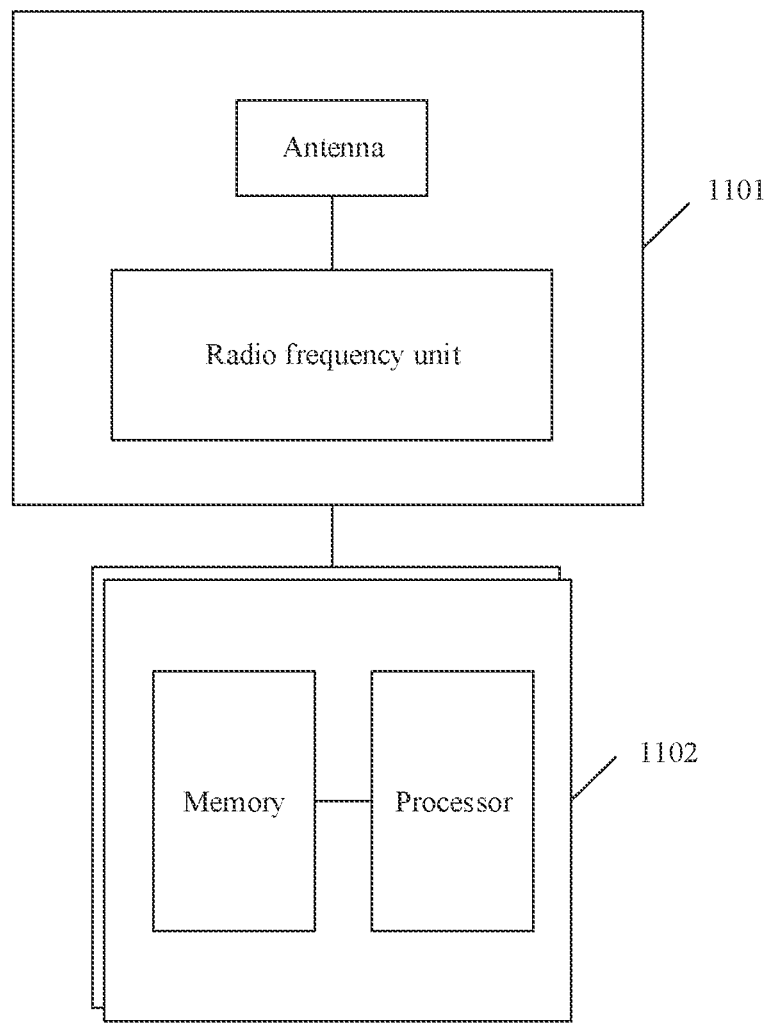
FIG. 11 is still another schematic structural diagram of a network device according to an embodiment of this application.

In a possible design, the network device may be implemented by using a base station in FIG. 11.

FIG. 11 is a schematic structural diagram of a base station according to an embodiment of this application. The base station includes a part 1101 and a part 1102. The part 1101 of the base station is mainly configured to: receive/send a radio frequency signal, and perform conversion between a radio frequency signal and a baseband signal. The part 1102 of the base station is mainly configured to: perform baseband processing, control the base station, and the like. The part 1101 may be usually referred to as a transceiver unit, a transceiver, a transceiver circuit, a transceiver, or the like. The part 1102 is usually a control center of the base station, and may be usually referred to as a monitoring unit, configured to control the base station to perform the steps performed by the base station (namely, a serving base station) in FIG. 3. For details, refer to the foregoing descriptions of the related parts.

The transceiver unit in the part 1101 may also be referred to as a transceiver, a transceiver, or the like, and includes an antenna and a radio frequency unit. The radio frequency unit is mainly configured to perform radio frequency processing. Optionally, a component that is in the part 1101 and that is configured to implement a receiving function may be considered as a receiving unit, and a component configured to implement a sending function may be considered as a sending unit. In other words, the part 1101 includes the receiving unit and the sending unit. The receiving unit may also be referred to as a receiver, a receiver, a receiver circuit, or the like, and the sending unit may be referred to as a transmitter, a transmitter, a transmitting circuit, or the like.

The part 1102 may include one or more boards. Each board may include one or more determining units and one or more memories, and the determining unit is configured to: read and execute a program in the memory, to implement a baseband processing function and controlling of the base station. If there are a plurality of hoards, the boards may be interconnected to enhance a processing capability. In an optional implementation, a plurality of boards may share one or more determining units, or a plurality of boards share one or more memories, or a plurality of boards simultaneously share one or more determining units. The memory and the determining unit may be integrated together, or may be independently disposed. In some embodiments, the part 1101 and the part 1102 may be integrated together, or may be independently disposed. In addition, all functions of the part 1102 may be integrated into one chip for implementation, or some functions may be integrated into one chip for implementation and some other functions are integrated into one or more other chips for implementation. This is not limited in this application.

A person skilled in the art should be aware that in the foregoing one or more examples, functions described in this application may be implemented by hardware, software, firmware, or any combination thereof. When the functions are implemented by software, the functions may be stored in a computer readable medium or transmitted as one or more instructions or code in the computer readable medium. The computer readable medium includes a computer storage medium and a communications medium. The communications medium includes any medium that enables a computer program to be transmitted from one place to another place. The storage medium may be any available medium accessible to a general-purpose or dedicated computer.

The objectives, technical solutions, and beneficial effects of this application are further described in detail in the foregoing specific implementations. It should be understood that the foregoing descriptions are merely specific implementations of this application, but are not intended to limit the protection scope of this application. Any modification, equivalent replacement, or improvement made based on technical solutions of this application shall fall within the protection scope of this application.

A person skilled in the art should understand that the embodiments of this application may be provided as a method, a system, or a computer program product. Therefore, the embodiments of this application may use a form of hardware only embodiments, software only embodiments, or embodiments in combination with software and hardware. In addition, the embodiments of this application may use a form of a computer program product that is implemented on one or more computer usable storage media (including but not limited to a magnetic disk memory, a CD-ROM, an optical memory, and the like) that include computer usable program code.

The embodiments of this application are described with reference to the flowcharts and/or block diagrams of the method, the device (system), and the computer program product according to the embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a determining unit of another programmable data processing device to generate a machine, so that the instructions executed by a computer or the determining unit of another programmable data processing device generate an apparatus for implementing a specific function in one or more procedures in the flowcharts and/or in one or more blocks in the block diagrams.

These computer program instructions may alternatively be stored in a computer readable memory that can instruct the computer or the another programmable data processing device to work in a specific manner, so that the instructions stored in the computer readable memory are used to generate an artifact that includes an instruction apparatus. The instruction apparatus implements a specific function in one or more procedures in the flowcharts and/or in one or more blocks in the block diagrams.

These computer program instructions may alternatively be loaded onto the computer or the another programmable data processing device, so that a series of operations and steps are performed on the computer or the another programmable device, to process the computer. Therefore, the instructions executed on the computer or the another programmable device are used to provide steps for implementing a specific function in one or more procedures in the flowcharts and/or in one or more blocks in the block diagrams.

It is clear that a person skilled in the art can make various modifications and variations to the embodiments of this application without departing from the spirit and scope of this application. Therefore, this application is intended to cover these modifications and variations provided that these modifications and variations of the embodiments of this application fall within the scope of the following claims of this application and equivalent technologies thereof.

What is claimed is:

1. A wireless communications method performed by an apparatus, comprising:
    receiving indication information on a first serving cell before an on-duration period of a first discontinuous reception (DRX) cycle, wherein the indication information comprises a bitmap including bits, wherein each bit corresponds to at least one second serving cell, and wherein each bit indicates not to monitor a physical downlink control channel (PDCCH) on the corresponding at least one second serving cell or to monitor a PDCCH on the corresponding at least one second serving cell; and
    not monitoring a PDCCH on the corresponding at least one second serving cell or not monitoring a PDCCH for the corresponding at least one second serving cell in the on-duration period of the first DRX cycle in response to that the indication information indicates not to monitor a PDCCH; or
    monitoring a PDCCH on the corresponding at least one second serving cell or monitoring a PDCCH for the corresponding at least one second serving cell in the on-duration period of the first DRX cycle in response to that the indication information indicates to monitor a PDCCH.

2. The wireless communications method according to claim 1,
    wherein not monitoring a PDCCH on the corresponding at least one second serving cell or not monitoring a PDCCH for the corresponding at least one second serving cell in the on- duration period of the first DRX cycle comprises: after receiving the indication information, not monitoring a PDCCH on the corresponding at least one second serving cell or not monitoring a PDCCH for the corresponding at least one second serving cell in the on-duration period of the first DRX cycle; or
    monitoring a PDCCH on the corresponding at least one second serving cell or monitoring a PDCCH for the corresponding at least one second serving cell in the on-duration period of the first DRX cycle comprises: after receiving the indication information, monitoring a PDCCH on the corresponding at least one second serving cell or monitoring a PDCCH for the corresponding at least one second serving cell in the on-duration period of the first DRX cycle.

3. The wireless communications method according to claim 2, wherein the method further comprises:
    not monitoring a PDCCH on the corresponding at least one second serving cell or not monitoring a PDCCH for the corresponding at least one second serving cell in the on-duration period of at least one DRX cycle after the first DRX cycle; or
    monitoring a PDCCH on the corresponding at least one second serving cell or monitoring a PDCCH for the corresponding at least one second serving cell in the on-duration period of at least one DRX cycle after the first DRX cycle.

4. The wireless communications method according to claim 1, wherein the first serving cell is a primary cell and the at least one second serving cell is at least one secondary cell.

5. The wireless communications method according to claim 1, wherein the at least one second severing cell is at least one activated secondary cell.

6. The wireless communications method according to claim 1, the receiving the indication information on the first serving cell before the on-duration period of the first DRX cycle comprises:
receiving the indication information on the first serving cell before a first timer starts, wherein the first timer is configured to determine a time length of the on-duration period of the first DRX cycle.

7. The wireless communications method according to claim 6, wherein the first timer is running in the on-duration period of the first DRX cycle.

8. The wireless communications method according to claim 1, wherein the apparatus comprises a terminal device or a chip of a terminal device.

9. The wireless communications method according to claim 1, wherein the indication information comprises downlink control information (DCI).

10. A wireless communications method performed by an apparatus, comprising:
sending indication information on a first serving cell before an on-duration period of a first discontinuous reception (DRX) cycle, wherein the indication information comprises a bitmap including bits, wherein each bit corresponds to at least one second serving cell, and wherein each bit indicates not to monitor a physical downlink control channel (PDCCH) on the corresponding at least one second serving cell or to monitor a PDCCH on the corresponding at least one second serving cell; and
not sending a PDCCH on the corresponding at least one second serving cell or not sending a PDCCH for the corresponding at least one second serving cell in the on-duration period of the first DRX cycle in response to that the indication information indicates not to monitor a PDCCH; or
sending a PDCCH on the corresponding at least one second serving cell or sending a PDCCH for the corresponding at least one second serving cell in the on-duration period of the first DRX cycle in response to that the indication information indicates to monitor a PDCCH.

11. The method according to claim 10, wherein:
not sending a PDCCH on the corresponding at least one second serving cell or not sending a PDCCH for the corresponding at least one second serving cell in the on-duration period of the first DRX cycle comprises: after sending the indication information, not sending a PDCCH on the corresponding at least one second serving cell or not sending a PDCCH for the corresponding at least one second serving cell in the on-duration period of the first DRX cycle;
sending a PDCCH on the corresponding at least one second serving cell or sending a PDCCH for the corresponding at least one second serving cell in the on-duration period of the first DRX cycle in response to that the indication information indicates to monitor a PDCCH comprises: after sending the indication information, sending a PDCCH on the corresponding at least one second serving cell or sending a PDCCH for the corresponding at least one second serving cell in the on-duration period of the first DRX cycle.

12. The method according to claim 11, wherein the method further comprises:
not sending a PDCCH on the corresponding at least one second serving cell or not sending a PDCCH for the corresponding at least one second serving cell in the on-duration period of at least one DRX cycle after the first DRX cycle; or
sending a PDCCH on the corresponding at least one second serving cell or sending a PDCCH for the corresponding at least one second serving cell in the on-duration period of at least one DRX cycle after the first DRX cycle.

13. The method according to claim 10, wherein the first serving cell is a primary cell and the at least one second serving cell is at least one secondary cell.

14. The method according to claim 10, wherein the at least one second severing cell is at least one activated secondary cell.

15. The method according to claim 10, wherein the sending the indication information on the first serving cell before an on-duration period of a first DRX cycle comprises:
sending the indication information on the first serving cell before a first timer starts, wherein the first timer is configured to determine a time length of the on-duration period of the first DRX cycle.

16. An apparatus, comprising:
at least one processor; and
at least one memory coupled to the at least one processor and storing programming instructions for execution by the at least one processor to perform operations comprising:
receiving indication information on a first serving cell before an on-duration period of a first discontinuous reception (DRX) cycle, wherein the indication information comprises a bitmap including bits, wherein each bit corresponds to at least one second serving cell, and wherein each bit indicates not to monitor a physical downlink control channel (PDCCH) on the corresponding at least one second serving cell or to monitor a PDCCH on the corresponding at least one second serving cell; and
not monitoring a PDCCH on the corresponding at least one second serving cell or not monitoring a PDCCH for the corresponding at least one second serving cell in the on-duration period of the first DRX cycle in response to that the indication information indicates not to monitor a PDCCH; or
monitoring a PDCCH on the corresponding at least one second serving cell or monitoring a PDCCH for the corresponding at least one second serving cell in the on-duration period of the first DRX cycle in response to that the indication information indicates to monitor a PDCCH.

17. The apparatus according to claim 16, wherein not monitoring a PDCCH on the corresponding at least one second serving cell or not monitoring a PDCCH for the corresponding at least one second serving cell in the on-duration period of the first DRX cycle comprises: after receiving the indication information, not monitoring a PDCCH on the corresponding at least one second serving cell or not monitoring a PDCCH for the corresponding at least one second serving cell in the on-duration period of the first DRX cycle; or monitoring a PDCCH on the corresponding at least one second serving cell or monitoring a PDCCH for the corresponding at least one second serving cell in the on-duration period of the first DRX cycle comprises: after receiving the indication information, monitoring a PDCCH on the corresponding at least one second serving cell or monitoring a PDCCH for the corresponding at least one second serving cell in the on-duration period of the first DRX cycle.

18. The apparatus according to claim 17, wherein the operations comprise:

not monitoring a PDCCH on the corresponding at least one second serving cell or not monitoring a PDCCH for the corresponding at least one second serving cell in the on-duration period of at least one DRX cycle after the first DRX cycle; or monitoring a PDCCH on the corresponding at least one second serving cell or monitoring a PDCCH for the corresponding at least one second serving cell in the on-duration period of at least one DRX cycle after the first DRX cycle.

19. The apparatus according to claim 16, wherein the apparatus comprises a terminal device or a chip of a terminal device; or, the indication information comprises downlink control information (DCI).

20. An apparatus, comprising:
at least one processor; and
at least one memory coupled to the at least one processor and storing programming instructions for execution by the at least one processor to perform operations comprising:

sending indication information on a first serving cell before an on-duration period of a first discontinuous reception (DRX) cycle, wherein the indication information comprises a bitmap including bits, wherein each bit corresponds to at least one second serving cell, and wherein each bit indicates not to monitor a physical downlink control channel (PDCCH) on the corresponding at least one second serving cell or to monitor a PDCCH on the corresponding at least one second serving cell; and not sending a PDCCH on the corresponding at least one second serving cell or not sending a PDCCH for the corresponding at least one second serving cell in the on-duration period of the first DRX cycle in response to that the indication information indicates not to monitor a PDCCH; or sending a PDCCH on the corresponding at least one second serving cell or sending a PDCCH for the corresponding at least one second serving cell in the on-duration period of the first DRX cycle in response to that the indication information indicates to monitor a PDCCH.

\* \* \* \* \*

UNITED STATES PATENT AND TRADEMARK OFFICE
CERTIFICATE OF CORRECTION

PATENT NO. : 12,101,717 B2
APPLICATION NO. : 17/277359
DATED : September 24, 2024
INVENTOR(S) : Yu Cai et al.

Page 1 of 1

It is certified that error appears in the above-identified patent and that said Letters Patent is hereby corrected as shown below:

In the Claims

In Column 36, In Line 40, In Claim 2, delete "on- duration" and insert -- on-duration --.

Signed and Sealed this
Seventeenth Day of December, 2024

Derrick Brent
*Acting Director of the United States Patent and Trademark Office*